(12) United States Patent
Hirata et al.

(10) Patent No.: US 6,440,378 B1
(45) Date of Patent: Aug. 27, 2002

(54) CATALYST FOR PURIFYING EXHAUST GASES, A METHOD OF PRODUCING THE SAME, AND A METHOD OF PURIFYING EXHAUST GASES

(75) Inventors: Hirohito Hirata, Toyota; Shinji Tsuji, Okazaki, both of (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/581,673

(22) PCT Filed: Dec. 4, 1998

(86) PCT No.: PCT/JP98/05526
§ 371 (c)(1),
(2), (4) Date: Jun. 16, 2000

(87) PCT Pub. No.: WO99/32223
PCT Pub. Date: Jul. 1, 1999

(30) Foreign Application Priority Data

Dec. 22, 1997 (JP) .............................. 9-353890
May 20, 1998 (JP) ........................... 10-138620
Sep. 1, 1998 (JP) ........................... 10-247482

(51) Int. Cl.$^7$ ..................... B01D 53/54; B01D 53/60
(52) U.S. Cl. .................. 423/239.1; 502/303; 502/304; 502/326; 502/333; 502/334; 502/514
(58) Field of Search .................. 423/239.1; 502/65, 502/66, 74, 87, 303, 304, 326, 333, 334, 514

(56) References Cited

U.S. PATENT DOCUMENTS

| | | | |
|---|---|---|---|
| 4,082,699 A | * | 4/1978 | Petrow et al. ............... 252/472 |
| 4,757,045 A | * | 7/1988 | Turner et al. ............... 502/252 |
| 6,165,429 A | * | 12/2000 | Ikeda et al. ............. 423/213.5 |

FOREIGN PATENT DOCUMENTS

| | | | |
|---|---|---|---|
| EP | 0 666 103 A1 | 8/1995 | |
| EP | 0 669 157 A1 | 8/1995 | |
| EP | 666103 A1 * | 9/1995 | ........... B01D/53/94 |
| JP | 59-160536 | 9/1984 | |
| JP | 63-97232 | 4/1988 | |
| JP | 3-86240 | 4/1991 | |
| JP | 5-293383 | 11/1993 | |
| JP | A-5-317625 | 12/1993 | ........... B01D/46/42 |
| JP | 6-269684 | 9/1994 | |
| JP | 7-68174 | 3/1995 | |
| JP | 7-100380 | 4/1995 | |
| JP | A-8-38897 | 2/1996 | ........... B01J/23/42 |
| JP | A-9-103651 | 4/1997 | ........... B01D/53/94 |
| JP | 10-216518 | 8/1998 | |
| JP | 10-216519 | 8/1998 | |
| WO | WO 95/32790 | 12/1995 | ........... B01D/53/94 |

OTHER PUBLICATIONS

Duff, D.G., et al "Catalysts derived from polymer–stabilized colloidal platinum, Effects of support and calcinations on the catalytic behavior in hydrogenation" Applied Catalysis A: General 133 (1995) 133–148.*

* cited by examiner

Primary Examiner—Steven P. Griffin
Assistant Examiner—Maribel Medina Sanabria
(74) Attorney, Agent, or Firm—Oliff & Berridge, PLC

(57) ABSTRACT

A noble metal composite colloid composed of a plurality of noble metals is constructed to be loaded on a porous oxide support. The noble metals are loaded in particles which are larger than the conventional grains in the atomic state. Thus, vapor pressure decreases and volatile components, such as $PtO_2$, are suppressed from dislocation or diffusion. In addition, affinity of the noble metals with the support is improved, and are suppressed from moving on the support. Thus, nobel metal grain growth is suppressed, decreases in catalytic activity is minimized and durability is improved.

6 Claims, 20 Drawing Sheets

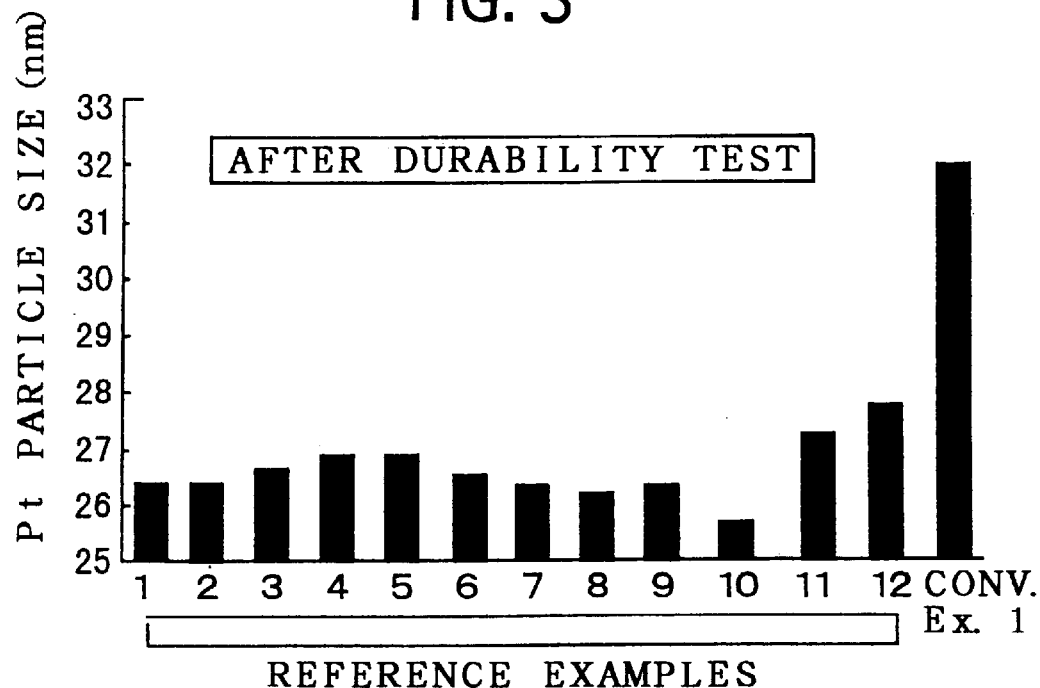
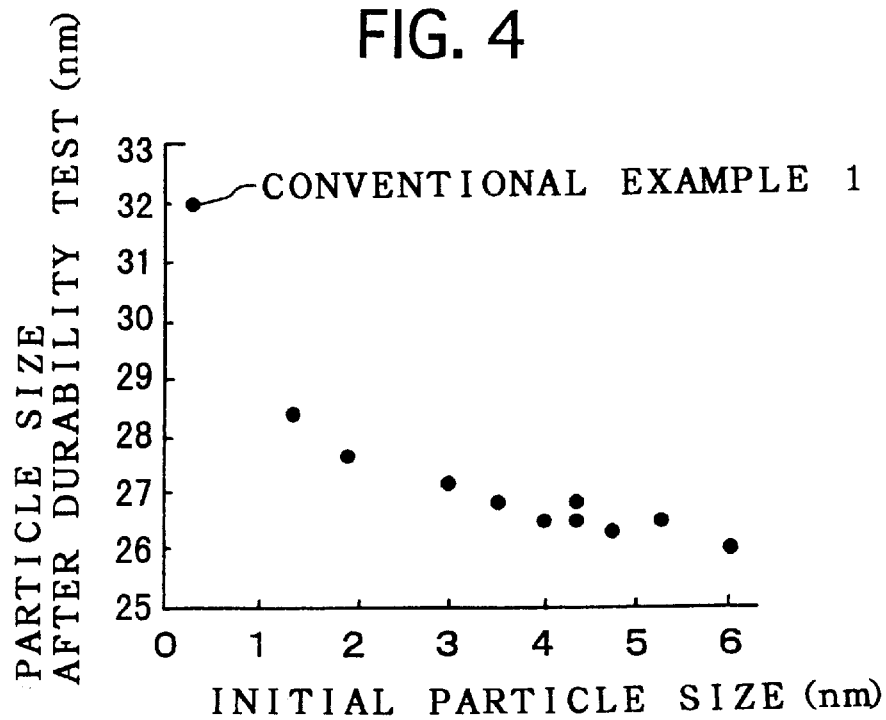

●: Pt  ○: Rh

●: Pt  ○: Rh

Ex. 1 BEFORE
DURABILITY TEST

Ex. 1 AFTER
DURABILITY TEST

Comp. Ex. 1 AFTER DURABILITY TEST

CATALYST FOR PURIFYING EXHAUST GASES, A METHOD OF PRODUCING THE SAME, AND A METHOD OF PURIFYING EXHAUST GASES

BACKGROUND OF THE INVENTION

1. Field of Invention

This invention relates to an exhaust-gases-purifying catalyst for purifying such toxic substances as hydrocarbons (HC), carbon monoxide (CO), and nitrogen oxides ($NO_x$) contained in exhaust gases from an automotive engine or other internal combustion engines or boilers, a method of producing this catalyst and a method of purifying exhaust gases by using this catalyst.

2. Description of Related Art

As catalysts for purifying exhaust gases from automotive engines, catalysts have been widely used in which such a noble metal as platinum (Pt), rhodium (Rh) and palladium (Pd) is loaded on a support formed of such a porous oxide as alumina ($Al_2O_3$). For example, a 3-way catalyst is formed by loading Pt and/or Rh on such a porous oxide as $\gamma$-$Al_2O_3$, and oxidizes HC and CO in the exhaust gases into innocuous entities and at the same time reduces $NO_x$ in the exhaust gases into innocuous entities. Pt, which is especially active, is mainly used as a noble metal.

Regarding the production of an exhaust-gases-purifying catalyst like this three-way catalyst, a porous oxide support powder or a porous oxide support coated on a honeycomb-shaped supporting base material is brought in contact with an aqueous solution of a noble metal chloride, a noble metal nitro complex, or a noble metal ammonium complex, and then dried and calcined. Thus, a noble metal is loaded. The noble metal loaded by this method is highly dispersed on an atomic level, and the resulting catalyst attains an extremely high catalytic activity.

On the other hand, carbon dioxide ($CO_2$) in the exhaust gases from the internal combustion engines of automobiles, etc. has recently become a problem in view of global environmental conservation. What we call "lean burn", i.e., burning lean fuel in oxygen-excessive atmospheres is desired as a solution to this problem. The lean burn improves fuel consumption, and as a result the amount of fuel consumed is decreased and $CO_2$, which is a combustion exhaust gas, can be suppressed from generating.

In this respect, the conventional 3-way catalysts aim to oxidize CO and HC and reduce $NO_x$ simultaneously into innocuous entities when the air-fuel ratio is at the ideal air-fuel ratio, i.e., at the stoichiometric point, and cannot exhibit sufficient reduction and removal of $NO_x$ in the exhaust gases in oxygen-excessive atmospheres at the time of lean burn. Hence, it has been desired to develop catalysts which are capable of purifying $NO_x$ adequately even in oxygen-excessive atmospheres.

Under these circumstances, the applicants et al of the present invention have proposed an exhaust-gases-purifying catalyst in which Pt and an $NO_x$ storage component such as Ba are loaded on a porous support formed of alumina, etc., for example, in Japanese Unexamined Patent Publication (KOKAI) No. 5-317,625. By using this catalyst for purifying exhaust gases and controlling the air-fuel ratio to change pulsatorily from the fuel-lean side to the stoichiometric point or the fuel-rich side, namely, to perform "fuel-rich spikes", $NO_x$ are adsorbed and stored by the $NO_x$ storage component on the fuel-lean side and the adsorbed $NO_x$ are released and react with reducing components such as HC and CO into innocuous entities at the stoichiometric point or on the fuel-rich side. Thus, $NO_x$ can be purified efficiently even in the case of lean burn.

In a method of producing an $NO_x$ storage and reduction type catalyst like this, a slurry including such a porous oxide as alumina and a binder is prepared and this slurry is coated on a honeycomb-shaped supporting base material formed of cordierite or a metal and calcined, thereby forming a coating layer. Next, the supporting base material having the coating layer thereon is immersed in a solution of a noble metal compound, thereby loading a noble metal, and then immersed in a solution of an $NO_x$ storage component, thereby loading the $NO_x$ storage component. Also known is another production method comprising preparing a slurry from a support powder in which an $NO_x$ storage component and a noble metal are loaded on alumina, etc., coating this slurry on a honeycomb supporting base material and calcining the material.

However, although the conventional 3-way catalysts and the $NO_x$ storage and reduction type catalysts exhibit superb catalytic activity in the initial stage of its use, they suffer from a drawback in that the catalytic activity gradually deteriorates as time passes. This degradation is particularly remarkable with the $NO_x$ storage and reduction type catalysts for purifying the exhaust gases from lean-burn engines. Our studies so far have clarified that the catalytic activity degradation with the passage of time is caused by the fact that since grains of noble metals, particularly Pt grow in fuel-lean oxygen-excessive atmospheres at high temperatures, the surface area of the noble metals decreases and consequently catalytic-activity sites decrease.

On the other hand, exhaust gases contain $SO_2$, which is produced from a sulfur component of a fuel, and the $SO_2$ is oxidized and react with an $NO_x$ storage component on a catalyst, thereby producing sulfates. The sulfates do not decompose and are stable around exhaust gas temperatures. Accordingly, there arises a problem that the $NO_x$ storage ability of the $NO_x$ storage component gradually disappears and the $NO_x$ purifying ability gradually deteriorates. This phenomenon is called sulfur poisoning of the $NO_x$ storage component.

The present invention has been developed in view of the aforementioned circumstances. It is a primary object of the present invention to suppress a decrease in catalytic activity by suppressing grain growth of a noble metal so as to improve the durability of 3-way catalytic activity and $NO_x$ conversion activity and provide an exhaust-gases-purifying catalyst with improved durability.

It is another object of the present invention to suppress sulfur poisoning of an $NO_x$ storage component in $NO_x$ storage and reduction type catalysts.

SUMMARY OF THE INVENTION

A catalyst for purifying exhaust gases recited in claim 2, which dissolves the above problems, is characterized in being produced by loading on a porous oxide support a noble metal composite colloid composed of a plurality of noble metals, and an $NO_x$ storage component selected from alkali metals, alkaline-earth metals and rare-earth elements.

A catalyst for purifying exhaust gases recited in claim 3 is characterized in being produced by loading a noble metal composite colloid composed of a plurality of noble metals on the surface of a porous oxide support, and loading an atomic-state noble metal in micro pores of the porous oxide support.

A catalyst for purifying exhaust gases recited in claim 4 is characterized in being produced by loading on the surface of a porous oxide support a noble metal composite colloid composed of a plurality of noble metals and an $NO_x$ storage component selected from alkali metals, alkaline-earth metals and rare-earth elements, and loading in micro pores of the porous oxide support a noble metal in the atomic state and the $NO_x$ storage component.

An exhaust-gases-purifying catalyst production method recited in claim 6, which is suitable to produce the exhaust-gases-purifying catalysts recited in claims 3 and 4, is characterized in comprising:

a separation step of taking a noble metal composite colloid out of a polymer-protected noble metal composite colloid which is composed of a plurality of noble metals and protected by a polymeric material;

a solution preparation step of dispersing the noble metal composite colloid in water by using a surfactant so as to prepare a surfactant-protected noble metal composite colloidal solution;

a noble-metal-colloid-loading step of bringing a porous oxide support in contact with the surfactant-protected noble metal composite colloidal solution so as to load a surfactant-protected noble metal composite colloid on the porous oxide support; and an atomic-state-noble-metal-loading step of bringing the porous oxide support in contact with an aqueous solution of pyromellitic acid and a noble metal compound so as to load an atomic-state noble metal on the porous oxide support.

A method of purifying exhaust gases recited in claim 7 is characterized in placing, in exhaust gases in oxygen-excessive atmospheres, a catalyst produced by loading on a porous oxide support a noble metal composite colloid composed of a plurality of noble metals and an $NO_x$ storage component selected from alkali metals, alkaline-earth metals and rare-earth elements so as to adsorb $NO_x$ in the exhaust gases on the $NO_x$ storage component, and changing the exhaust gas atmospheres to the stoichiometric point or on the fuel-rich side so as to release the $NO_x$ from the $NO_x$ storage component and reduce the $NO_x$.

BRIEF DESCRIPTION OF THE DRAWINGS

FIG. 3 is a graph showing the Pt particle size of the catalysts of the reference examples and the catalyst of Conventional Example 1 after a durability test;

FIG. 4 is a graph showing the relation between the Pt particle size of the catalysts of the reference examples and Conventional Example 1 in the initial stage and those after the durability test;

DETAILED DESCRIPTION OF PREFERRED EMBODIMENTS

In the conventional catalyst, since Pt is loaded while highly dispersed on an atomic level, grain growth is supposed to be caused by the following two mechanisms.

(1) In fuel-lean oxygen-excessive atmospheres at high temperatures, Pt is oxidized into volatile $PtO_2$, which leaves the original loaded positions and diffuses to be caught by other Pt atoms or Pt micro particles. Thus, grain growth is caused.

(2) For example, owing to a small affinity of Pt and $Al_2O_3$, Pt atoms or Pt micro particles easily move on the surface of an $Al_2O_3$ support, repeatedly collide against and fuse with each other. Thus grain growth is caused.

In the above mechanism (1), the dislocation and diffusion of $PtO_2$ is dependent on its vapor pressure. A smaller particle with a higher vapor pressure leaves its original position and diffuses more easily. When this particle becomes a larger particle with a lower vapor pressure by grain growth, the particle becomes stable. Thus grain growth is caused. Therefore, grain growth can be suppressed by loading beforehand Pt particles of a size which does not allow easy dislocation or diffusion.

On the other hand, in the mechanism (2), grain growth can be suppressed by increasing the affinity of Pt and $Al_2O_3$.

In the exhaust-gases-purifying catalysts recited in claim 2, noble metals are loaded in the state of a noble metal composite colloid. Since the noble metals are loaded as noble metal colloidal particles which are respectively assemblies of ten to several thousands of atoms, $PtO_2$ is suppressed from dislocation or diffusion in oxygen-excessive fuel-lean atmospheres at high temperatures when compared with $PtO_2$ in the case of using the conventional exhaust-gases-purifying catalysts in which a noble metal is loaded in the atomic state. Thus, grain growth due to the above mechanism (1) is suppressed.

Moreover, noble metals are loaded in the state of a noble metal composite colloid composed of a plurality of noble metals. Therefore, for example, when Pt and Rh or Pt and Pd are made into a composite, there is generated $Rh_2O_3$, RhO, PdO, or the like, which has a great affinity with a support formed of $Al_2O_3$ or the like. Also the noble metal composite colloid and $Al_2O_3$ have a high affinity with each other. Consequently, the noble metal composite colloid is suppressed from moving on the support and grain growth due to the mechanism (2) is suppressed.

Figure 1:
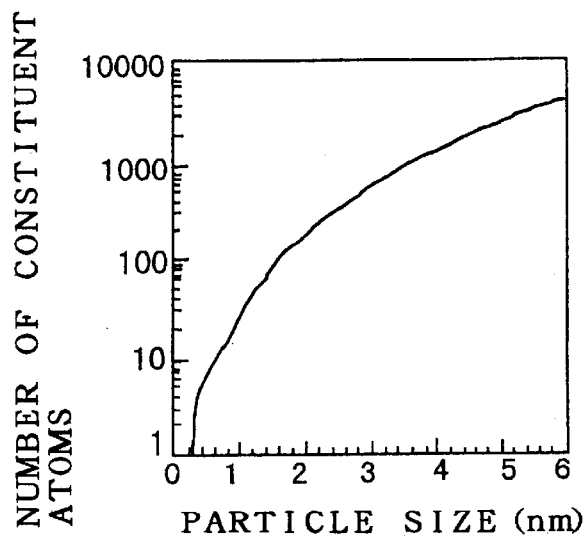
FIG. 1 is a graph showing the relation between colloidal particle size and the number of atoms constituting a colloid.

The particle size of the loaded noble metal composite colloid is preferably in the range from 1 to 5 nm. Theoretically, the particle size of the colloid and the number of constituent atoms have the relation shown in FIG. 1. When the particle size is from 1 to 5 nm, the number of constituent atoms is from 10 to 3000. When the particle size is smaller than 1 nm, the colloid is very close to the atomic state and grain growth due to the mechanism (1) is liable to be observed. When the particle size is greater than 5 nm, the surface area of the noble metal composite colloid decreases and the initial conversion ratio lowers. With a particle size of 1 to 5 nm, grain growth due to the mechanisms (1) and (2) can be suppressed efficiently, so the durability is improved and at the same time a high initial conversion activity can be secured owing to the large surface area of the noble metal composite colloid.

As noble metals constituting the noble metal composite colloid, it is possible to employ iridium (Ir), silver (Ag) and so on besides Pt, Rh and Pd. Two or more kinds of these noble metals can be selected for use. It is desirable to employ at least Pt, which has an especially high catalytic activity. It is desirable to employ Pt and Rh in combination. Because the grain growth of Rh in fuel-lean atmospheres is remarkably small when compared with Pt, the existence of Rh improves the durability of the three-way catalytic activity. In addition, because Rh is loaded in separation from an $NO_x$ storage component on a micro scale, the poor affinity of Rh and the $NO_x$ storage component does not become a problem, and the performance of the $NO_x$ storage component and Rh is prevented from degrading.

Furthermore, when Pt and Rh are employed in combination, hydrogen, which has a high reducing power, is generated from HC and $H_2O$ in exhaust gases because of Rh, and this hydrogen highly contributes to reduction of $NO_x$ and dislocation of $SO_x$. Consequently, when compared with the conventional catalyst, the amount of $NO_x$ reduced after fuel-rich spikes becomes high and at the same time sulfur poisoning of the $NO_x$ storage component is extremely small.

In the catalysts recited in claim 2, the amount of a noble metal composite colloid loaded can be, for example, in the range from 0.1 to 20% by weight. When the amount is less than 0.1% by weight, the conversion ratio is low from the initial stage. The amount of more than 20% by weight is not suitable for industrial use, because of saturation of catalyst efficiency and high production costs. The ratio of the plurality of noble metals which constitute a noble metal composite colloid is not particularly limited, but there are sometimes optimum ratios depending on the kind of noble metals. For example, when a noble metal composite colloid is composed of Pt and Rh, it is desirable that the noble metal composite colloid contains 10 to 80 mol % Rh. Within this range, the conversion activity in the initial stage and after the durability test is particularly excellent.

Examples of the porous oxide support include alumina ($Al_2O_3$), silica ($SiO_2$), titania ($TiO_2$), zirconia ($ZrO_2$), silica-alumina, and zeolite.

As an $NO_x$ storage element constituting the $NO_x$ storage component, it is possible to use at least one element selected from alkali metals, alkaline-earth metals and rare-earth elements. Examples of alkali metals are lithium (Li), sodium (Na), potassium (K) and cesium (Cs). Alkaline-earth metals are the elements of Group IIA in the periodic table and include, for example, magnesium (Mg), calcium (Ca), strontium (Sr) and barium (Ba). Examples of rare-earth elements are lanthanum (La), cerium (Ce), praseodium (Pr).

The desirable amount of this $NO_x$ storage component to be loaded is in the range from 0.05 to 0.5 mol with respect to 120 g of the porous oxide support. When the amount is less than this range, the $NO_x$ conversion ability can hardly be exhibited. When the amount exceeds this range, not only the effect of the $NO_x$ storage component is saturated but also the amount of noble metals to be loaded decreases and the conversion activity deteriorates.

In loading the $NO_x$ storage component on the porous oxide support, a similar method to the conventional method can be employed which comprises the steps of impregnating a porous oxide support with a solution of a soluble salt or complex of the above $NO_x$ storage elements, and drying and calcining the impregnated support.

By the way, the porous support has a great number of micro pores, and HC, etc., in exhaust gases are often adsorbed in the micro pores. For example, since zeolite has micro pores of a size on the angstrom order, which is approximately equal to the order of the molecule diameter of HC, zeolite is even used as a HC adsorbent. Therefore, it is desirable to oxidize HC adsorbed in the micro pores efficiently, or use the adsorbed HC to reduce $NO_x$ into innocuous entities.

However, because of the relatively large particle size, the noble metal composite colloid according to the present invention suffers from a drawback in that it is difficult to load the noble metal composite colloid in the relatively small diameter micro pores of the porous oxide support and that HC adsorbed in the micro pores are used at a low efficiency. Besides, owing to its adsorption characteristics the $NO_x$ storage component is loaded both on the surface and in the micro pores of the porous oxide support, but there is also a problem that the $NO_x$ storage component loaded in the micro pores is utilized at a low efficiency when no noble metal exists in the micro pores.

Therefore, in the exhaust-gases-purifying catalyst recited in claim 3, a noble metal composite colloid is loaded on the surface of the porous oxide support, and a noble metal in the atomic state is loaded in the micro pores of the porous oxide support. Owing to this arrangement, HC adsorbed in the micro pores can be oxidized efficiently and the three-way activity is enhanced.

In the exhaust-gases-purifying catalyst recited in claim 4, a noble metal composite colloid and an $NO_x$ storage component are loaded on the surface of a porous oxide support, and a noble metal in the atomic state and an $NO_x$ storage component are loaded in the micro pores of the porous oxide support. Owing to this arrangement, the $NO_x$ storage component loaded in the micro pores is improved in utilization efficiency and the $NO_x$ conversion activity is enhanced.

In the exhaust-gases-purifying catalysts recited in claim 3 and claim 4, it is preferable that the amount of the noble metal composite colloid loaded and the amount of a noble metal loaded in the atomic state have a ratio by weight of about 1 to 1. When the noble metal in the atomic state is loaded beyond this ratio, the noble metal becomes to be loaded not only in the micro pores but also on the surface of the porous oxide support, which results in easy grain growth. On the other hand, when the noble metal in the atomic state is loaded under this ratio, HC adsorbed in the micro pores are hard to be oxidized, which results in a decrease in the utilization efficiency of the $NO_x$ storage component loaded in the micro pores.

Several methods can be employed for producing a noble metal composite colloid and loading the colloid on a porous oxide support: a method of utilizing electrostatic adsorption, a method of utilizing high polymer chain adsorption to the support, the method of using a surfactant-protected noble metal composite colloid recited in claim 6, etc.

For instance, in the method of utilizing high polymer chain adsorption to the support, first a plurality of water-soluble noble metal compounds and alcohol are mixed in an aqueous solution of a water-soluble high polymer such as polyvinyl pyrrolidone, polyvinyl alcohol and heated, thereby forming a polymer-protected noble metal composite colloid. This method is called a polymer protection method. Then porous support powder formed of such an oxide as alumina is dispersed in this aqueous solution of the polymer-protected noble metal composite colloid, and then dried and calcined, thereby producing noble metal composite colloid-loaded catalyst powder. A catalyst for purifying exhaust gases can be produced by coating this catalyst powder on a honeycomb supporting base material, etc.

However, in the above production method, the polymer chains of the polymeric material serving as a protective agent lie extensively in an aqueous solution of a polymer-protected noble metal composite colloid and accordingly colloidal particles in the aqueous solution have a large radius (fluid radius). So, clearly this production method has a defect in that the colloidal particles are prevented from diffusing into relatively large micro pores of the porous oxide support, which results in poor adsorption to the support.

In view of this, the noble metal composite colloid is loaded preferably by bringing the porous oxide support in contact with a surfactant-protected noble metal composite colloidal solution. The surfactant-protected noble metal composite colloid has a smaller colloidal particle fluid radius, because the molecule length of the surfactant which acts as a protective agent in the surfactant-protected noble metal composite colloid is smaller than that of the polymeric material which acts as a protective agent in the polymer-protected noble metal composite colloid. Therefore the colloid adsorption performance to the support improves. Besides, since electrostatic characteristics of the colloidal particle surface can be controlled freely by pH control, selective adsorption to the support can be improved. In the case of using a plurality of porous oxide supports, setting of appropriate conditions enables plural kinds of colloidal particles to be loaded on plural kinds of supports respectively in separation.

In this exhaust-gases-purifying catalyst production method, first in a separation step, a noble metal composite colloid is taken out of a polymer-protected noble metal composite colloid. This separation step is carried out simply, for example, by removing a polymeric protective agent from the polymer-protected noble metal composite colloid. It is possible to use a ligand substitution method, a method of hydrolyzing the polymeric protective agent, etc. for this purpose.

The noble metal composite colloid obtained in the separation step is dispersed in water by using a surfactant, thereby formed into a surfactant-protected noble metal composite colloidal solution. The surfactant to be employed can be anionic, cationic, amphoteric or nonionic. It is particularly preferable to use such a surfactant which tends to form a micell in an aqueous solution as sodium lauryl sulfate, lauryl trimethyl ammonium chloride, polyethylene glycol lauryl ether and β-N-lauryl amino propionic acid.

Then a porous oxide support can be brought in contact with the surfactant-protected noble metal composite colloidal solution and dried and calcined to obtain catalyst powder in which a noble metal composite colloid is loaded on the porous oxide support. This catalyst powder can be coated on a honeycomb supporting base material, etc. formed of a heat-resistant oxide such as cordierite or a metal to obtain a catalyst for purifying exhaust gases.

Besides, this exhaust-gases-purifying catalyst production method can be produced by loading an $NO_x$ storage component on the porous oxide support by the aforementioned method, after the exhaust-gases-purifying catalyst production method recited in claim 5 is carried out, or before or after the porous oxide support is brought in contact with the surfactant-protected noble metal composite colloidal solution.

In the case of producing the exhaust-gases-purifying catalyst recited in claim 4, it is necessary to load an atomic-state noble metal only in the micro pores of the porous oxide support. This is because it becomes difficult to suppress grain growth of the noble metal when the noble metal in the atomic state is loaded on the surface of the support. However, if a noble metal is loaded by using an aqueous solution of a noble metal compound just as in the general conventional method, there arises a problem that the noble metal is loaded not only in the micro pores but also on the surface of the support.

Therefore, in the production method recited in claim 6, a noble metal in the atomic state is loaded by bringing the porous oxide support in contact with a solution of pyromellitic acid and a noble metal compound in water. Because of its relatively large molecular size, pyromellitic acid is difficult to enter into the relatively small diameter micro pores of the porous oxide support. In addition, since the hydroxyl group of the porous oxide support is masked with pyromellitic acid, it is difficult to load a noble metal by chemical adsorption. Therefore, when the porous oxide support is brought in contact with a solution of pyromellitic acid and a noble metal compound in water, the hydroxyl group on the support surface is masked with the pyromellitic acid but the hydroxyl group in the micro pores is not masked, i.e., is revealed, so the noble metal is loaded in the micro pores by chemical adsorption according to priority. Thus, the noble metal in the atomic state can be loaded only in the micro pores.

The noble metal colloid-loading step and the atomic-state noble metal-loading step recited in claim 6 can be carried out separately or simultaneously as described in the preferred embodiments.

In the exhaust-gases-purifying method recited in claim 7, the catalyst recited in claim 2 is placed in exhaust gases in oxygen-excessive fuel-lean atmospheres so that the $NO_x$ storage component adsorbs $NO_x$ in the exhaust gases. Then the exhaust gas atmospheres can be at the stoichiometric point or on the fuel-rich side so that the $NO_x$ storage component releases the $NO_x$, and the released $NO_x$ are reduced into innocuous entities by HC and CO in the exhaust gases or $H_2$ generated by Rh.

According to this method of purifying exhaust gases, grain growth of noble metals is suppressed and as a result the amount of $NO_x$ stored can be prevented from decreasing after a durability test, etc. Also since grain growth of noble metals is suppressed, the $NO_x$ storage component is prevented from suffering from sulfur poisoning. Therefore, the durability of the $NO_x$ conversion ability is improved.

It must be noted that in this method of purifying exhaust gases, the conditions of changing the exhaust gas atmospheres from the fuel-lean side to the stoichiometric point or the fuel-rich side are not particularly limited and optimal conditions for use can be employed.

Preferred Embodiments

Hereinafter, the present invention will be explained concretely by reference examples, examples and comparative examples.

REFERENCE EXAMPLE 1

0.6566 g of $PtCl_4$ ($5H_2O$) and 7.39 g of sodium dodecyl sulfate were mixed in 500 g of water and stirred so as to prepare a uniform aqueous solution. Then, 10 g of citrate dihydrate was added to this aqueous solution and the mixture was treated at reflux at 100° C. for two hours, thereby obtaining a Pt colloidal solution. 24 g of γ-$Al_2O_3$ powder was introduced into this colloidal solution. The mixture was stirred for 15 minutes and then filtered. After dried at 110° C. for two hours, this material was calcined at 450° C. for two hours, thereby obtaining a Pt colloid-loaded catalyst. The amount of Pt loaded was $6.4 \times 10^{-5}$ mol with respect to 1 g of γ-$Al_2O_3$ powder.

REFERENCE EXAMPLE 2

0.6566 g of $PtCl_4$ ($5H_2O$) and 4.27 g of sodium laurate were mixed in 500 g of water and stirred to prepare a uniform aqueous solution. 10 g of citrate dihydrate was added to this aqueous solution. This mixture was treated at reflux at 100° C. for two hours, thereby obtaining a Pt colloidal solution. 24 g of γ-$Al_2O_3$ powder was introduced into this colloidal solution and nitric acid was added to this solution so as to adjust pH to 4. The solution was stirred for 15 minutes and then filtered. After dried at 110° C. for two hours, this material was calcined at 450° C. for two hours, thereby obtaining a Pt colloid-loaded catalyst. The amount of Pt loaded was $6.4 \times 10^{-5}$ mol with respect to 1 g of γ-$Al_2O_3$ powder. The reason why the pH was adjusted to 4 was to remove counter ions which electrostatistically shield the colloidal surface and increase the electrostatic charge on the colloidal surface.

REFERENCE EXAMPLE 3

0.6566 g of $PtCl_4$ ($5H_2O$) and 0.89 g of polyvinyl pyrrolidone with a number average molecular weight of 25,000 were mixed in 400 g of water and stirred to prepare a uniform aqueous solution. 100 g of ethanol was added to this aqueous solution, and this mixture was treated at reflux at 90° C. for two hours, thereby obtaining a Pt colloidal solution. 24 g of γ-$Al_2O_3$ powder was introduced into this colloidal solution and the mixture was concentrated and dried to obtain solids. After dried at 110° C. for two hours, this material was calcined at 450° C. for two hours, thereby obtaining a Pt colloid-loaded catalyst. The amount of Pt loaded was $6.4 \times 10^{-5}$ mol with respect to 1 g of γ-$Al_2O_3$ powder.

REFERENCE EXAMPLE 4

0.6566 g of $PtCl_4$ ($5H_2O$) and 0.89 g of polyvinyl pyrrolidone with a number average molecular weight of 25,000 were mixed in 400 g of water and stirred to prepare a uniform aqueous solution. 100 g of ethanol was added to this aqueous solution, and this mixture was treated at reflux at 90° C. for two hours, thereby obtaining a Pt colloidal solution. This colloidal solution was concentrated by using a rotary evaporator, thereby obtaining a solution at a Pt concentration of 5% by weight.

On the other hand, 24 g of γ-$Al_2O_3$ powder was dispersed in 300 g of water and then 6 g of the aforementioned solution was added and the mixture was stirred for 30 minutes and then filtered. After dried at 110° C. for two hours, this material was calcined at 450° C. for two hours, thereby obtaining a Pt colloid-loaded catalyst. The amount of Pt loaded was $6.4 \times 10^{-5}$ mol with respect to 1 g of γ-$Al_2O_3$ powder.

REFERENCE EXAMPLE 5

0.6566 g of $PtCl_4$ ($5H_2O$) and 0.89 g of polyvinyl pyrrolidone with a number average molecular weight of 25,000 were mixed in 400 g of water and the mixture was stirred to prepare a uniform aqueous solution. 100 g of ethanol was added to this aqueous solution and, this mixture was treated at reflux at 90° C. for two hours, thereby obtaining a Pt colloidal solution. This colloidal solution was concentrated by using a rotary evaporator into black paste. Then the paste was dried under vacuum, thereby obtaining Pt colloid powder. This Pt colloid powder was dispersed in water to prepare a Pt colloidal solution at a Pt concentration of 5% by weight.

On the other hand, 24 g of γ-$Al_2O_3$ powder was dispersed in 300 g of water and 6 g of the above Pt colloidal solution was added and stirred for 30 minutes and then filtered. After dried at 110° C. for two hours, this material was calcined at 450° C. for two hours, thereby obtaining a Pt colloid-loaded catalyst. The amount of Pt loaded was $6.4 \times 10^{-5}$ mol with respect to 1 g of γ-$Al_2O_3$ powder.

REFERENCE EXAMPLE 6

0.6566 g of $PtCl_4$ ($5H_2O$) and 0.89 g of polyvinyl pyrrolidone with a number average molecular weight of 25,000 were mixed in 400 g of water and the mixture was stirred to prepare a uniform aqueous solution. 100 g of ethanol was added to this aqueous solution and, this mixture was treated at reflux at 90° C. for two hours, thereby obtaining a Pt colloidal solution. These steps are the same as those of Reference Example 4.

Next, this colloidal solution was cooled to 20° C., and 0.4236 g of $PtCl_4$ ($5H_2O$) was added. After stirred for one hour, this solution was treated at reflux at 90° C. for two hours. This colloidal solution was concentrated by using a rotary evaporator so as to prepare a solution at a Pt concentration of 5% by weight.

On the other hand, 24 g of γ-$Al_2O_3$ powder was dispersed in 300 g of water and 6 g of the above solution was added and stirred for 30 minutes and filtered. After dried at 110° C. for two hours, this material was calcined at 450° C. for two hours, thereby obtaining a Pt colloid-loaded catalyst. The amount of Pt loaded was $6.4 \times 10^{-5}$ mol with respect to 1 g of γ-$Al_2O_3$ powder.

REFERENCE EXAMPLE 7

A catalyst was produced in a similar method to that of Reference Example 6 except that $PtCl_4$ ($5H_2O$) for the second addition was in an amount of 0.5767 g instead of 0.4236 g. The amount of Pt loaded was $6.4 \times 10^{-5}$ mol with respect to 1 g of γ-$Al_2O_3$ powder.

REFERENCE EXAMPLE 8

A catalyst was produced in a similar method to that of Reference Example 6 except that $PtCl_4$ ($5H_2O$) for the second addition was in an amount of 0.7512 g instead of 0.4236 g. The amount of Pt loaded was $6.4 \times 10^{-5}$ mol with respect to γ-$Al_2O_3$ powder.

REFERENCE EXAMPLE 9

A catalyst was produced in a similar method to that of Reference Example 6 except that $PtCl_4$ ($5H_2O$) for the second addition was in an amount of 0.9501 g instead of 0.4236 g. The amount of Pt loaded was $6.4 \times 10^{-5}$ mol with respect to 1 g of γ-$Al_2O_3$ powder.

REFERENCE EXAMPLE 10

A catalyst was produced in a similar method to that of Reference Example 6 except that PtCl4 ($5H_2O$) for the second addition was in an amount of 1.1723 g instead of 0.4236 g. The amount of Pt loaded was $6.4 \times 10^{-5}$ mol with respect to 1 g of γ-$Al_2O_3$ powder.

REFERENCE EXAMPLE 11

A catalyst was produced in a similar method to that of Reference Example 3 except that the amount of polyvinyl pyrrolidone was 3.39 g instead of 0.89 g. The amount of Pt loaded was $6.4 \times 10^{-5}$ mol with respect to 1 g of γ-$Al_2O_3$ powder.

REFERENCE EXAMPLE 12

A catalyst was produced in a similar method to that of Reference Example 3 except that the amount of polyvinyl pyrrolidone was 9.05 g instead of 0.89 g. The amount of Pt loaded was $6.4 \times 10^{-5}$ mol with respect to 1 g of γ-$Al_2O_3$ powder.

CONVENTIONAL EXAMPLE 1

24 g of γ-$Al_2O_3$ powder was introduced into 500 g of a nitric acid solution including a platinum dinitrodiamine complex (including 0.25 g of Pt) and stirred for 15 minutes and then filtered. After dried at 110° C. for two hours, the material was calcined at 450° C. for two hours, thereby obtaining a catalyst of Conventional Example 1. The amount of Pt loaded was $6.4 \times 10^{-5}$ mol with respect to 1 g of γ-$Al_2O_3$ powder.

<Experiment 1>

The Pt particle size of the catalysts of the above Reference Examples 1 to 12 and Conventional Example 1 were respectively measured by the CO pulse method. The results are presented in FIG. 2. Besides, a durability test in which each catalyst was calcined at 800° C. for 10 hours in the air was carried out. The measurements of the Pt particle size after the durability test by the X-ray diffraction method are shown in FIG. 3. FIG. 4 shows the relation between the Pt particle sizes in the initial stage and those after the durability test, which are plotted from the respective results.

<Experiment 2>

Figure 5:
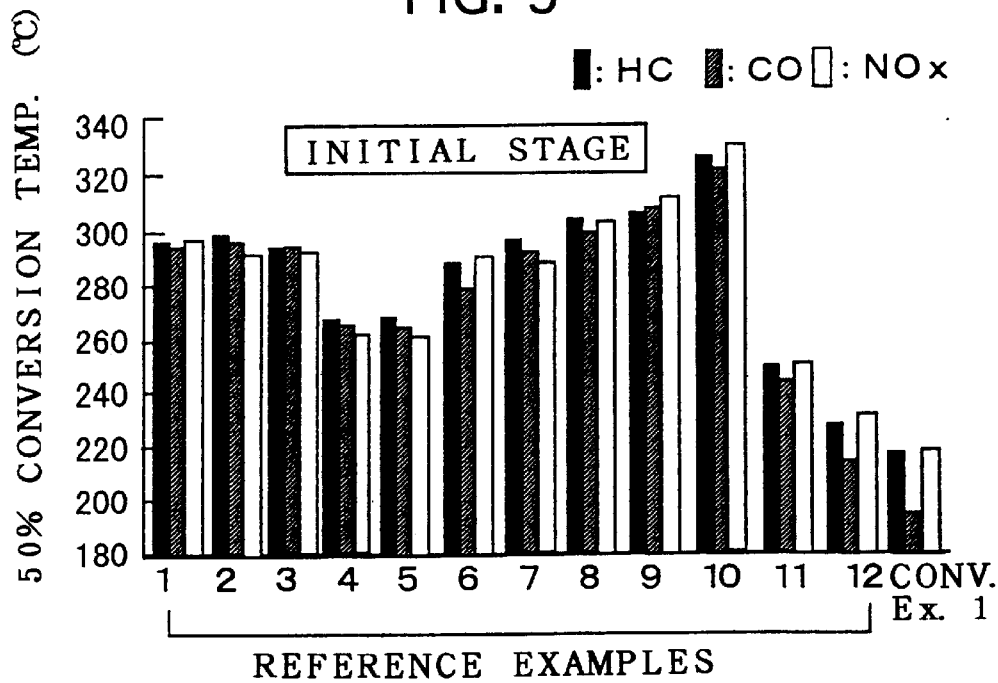
FIG. 5 is a graph showing 50% conversion temperatures of the catalysts of the reference examples and the catalyst of Conventional Example 1 in the initial stage.
Figure 6:
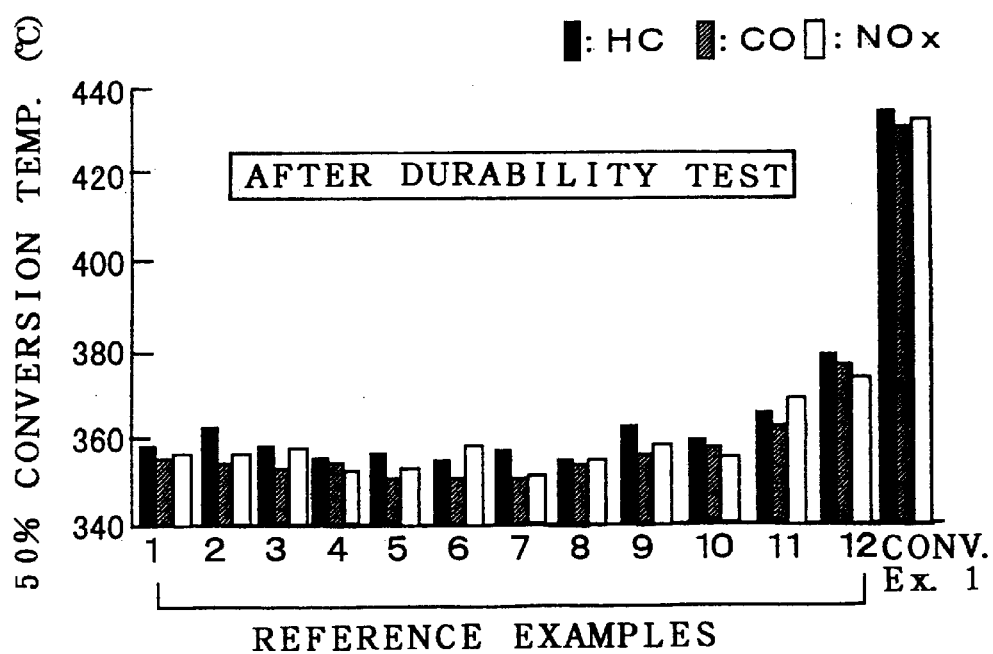
FIG. 6 is a graph showing 50% conversion temperatures of the catalysts of the reference examples and the catalyst of Conventional Example 1 after the durability test.

The catalysts of the above Reference Examples 1 to 12 and Conventional Example 1 were respectively placed in laboratory reactors and a model exhaust gas with the composition shown in Table 1 was introduced at a gas space velocity of 20,000 $hr^{-1}$. Then the catalyst bed temperature was varied in the range from 25 to 600° C., and the catalyst bed temperatures at the 50% conversion of HC ($C_3H_6$), CO and NO were measured. The results are shown in FIG. 5. A durability test was carried out in the same way as in Experiment 1 and the 50% conversion temperatures of the respective catalysts after the durability test were measured, and the results are presented in FIG. 6. Furthermore the relations between the 50% conversion temperatures in the initial stage or those after the durability test and the initial Pt particle size are respectively shown in FIGS. 7 and 8.

TABLE 1

| | GAS | | | | | | |
|---|---|---|---|---|---|---|---|
| | $C_3H_6$ (ppm) | CO (ppm) | NO (ppm) | $H_2$ (ppm) | $O_2$ (%) | $CO_2$ (%) | $H_2O$ (%) | $N_2$ |
| COMP. | 7200 | 1200 | 2400 | 400 | 0.50 | 14.4 | 3 | balance |

<Evaluation>

Figure 2:
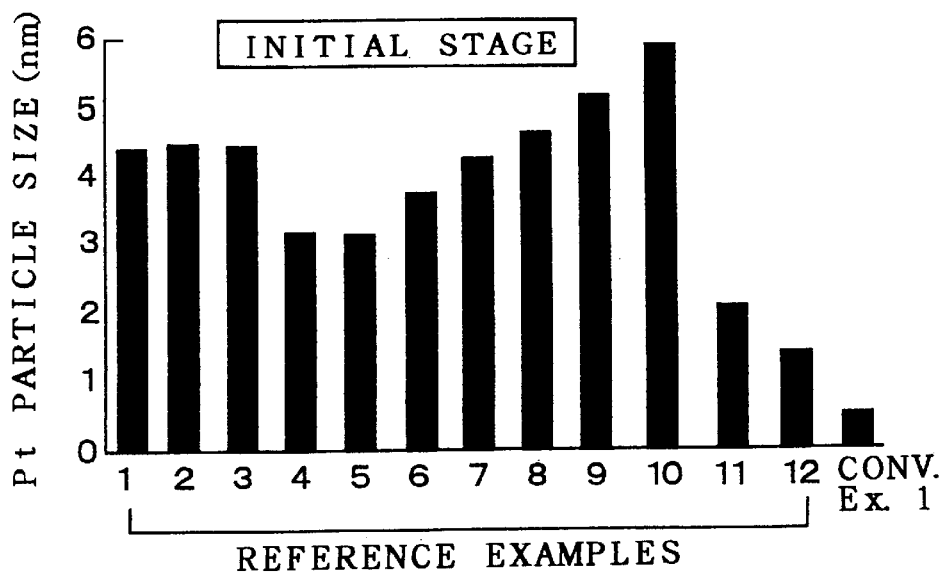
FIG. 2 is a graph showing the Pt particle size of the catalysts of reference examples and the catalyst of Conventional Example 1 in the initial stage.

It is appreciated from FIGS. 2 to 4 that the respective catalysts of the reference examples had larger initial Pt particle sizes than the initial Pt particle size (less than 1 nm) of Conventional Example 1 but kept to have smaller Pt particle sizes than that of Conventional Example 1 after the durability test. It is clear from FIG. 6 that the respective catalysts of the reference examples had remarkably better conversion abilities than that of Conventional Example 1 after the durability test. That is to say, in the respective catalysts of the reference examples, Pt grain growth was suppressed when compared with that of Conventional Example 1. This is apparently an effect of loading Pt as a colloid of 1 nm or more in particle size.

Figure 7:
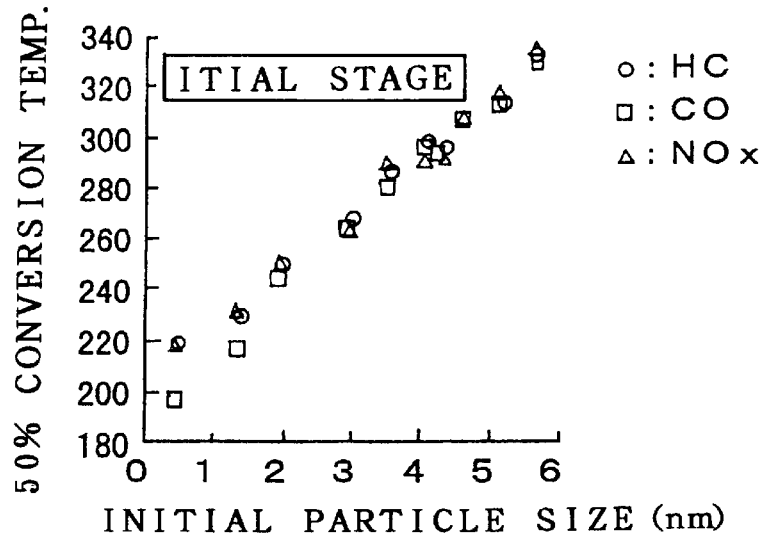
FIG. 7 is a graph showing the relation between the initial Pt particle size and the initial 50% conversion temperatures of the catalysts of the reference examples and the catalyst of Conventional Example 1.
Figure 8:
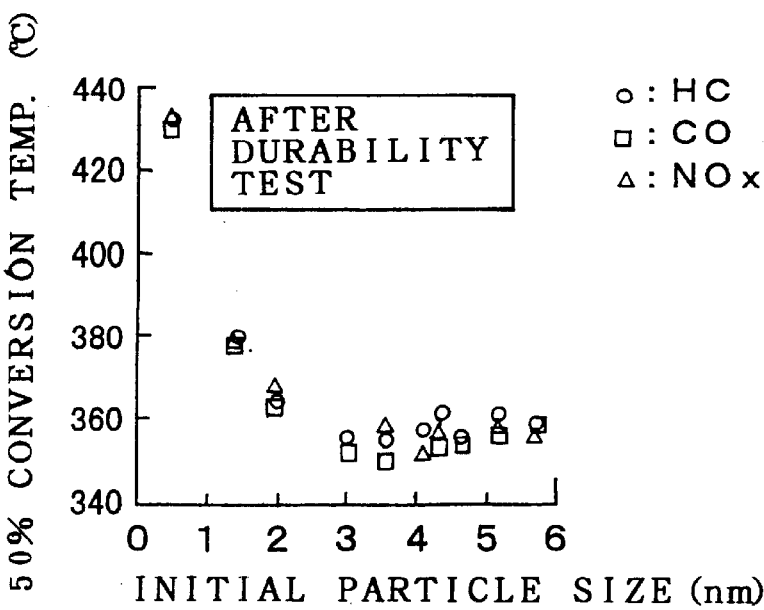
FIG. 8 is a graph showing the relation between the Pt particle size in the initial stage and the 50% conversion temperatures after the durability test of the catalysts of the reference examples and the catalyst of Conventional Example 1.

However, it is also apparent from FIG. 7 that the initial particle size of the Pt colloid is desirably in the range from 1 to 5 nm because the initial 50% conversion temperatures exceeded 300° C. when the initial Pt particle size was over 5 nm.

In view of the above results, the particle size of the noble metal composite colloid in the initial stage was controlled to be about 3 nm in the following reference examples.

REFERENCE EXAMPLE 13

0.591 g of $PtCl_4$ ($5H_2O$), 0.027 g of $PdCl_2$ and 0.89 g of polyvinyl pyrrolidone with a number average molecular weight of 25,000 were mixed in 400 g of water and the mixture was stirred to prepare a uniform aqueous solution. 100 g of ethanol was added to this aqueous solution and the mixture was treated at reflux at 90° C. for two hours, thereby obtaining a Pt—Pd composite colloidal solution (Pt: 90 mol %, Pd: 10 mol %). This colloidal solution was concentrated by using a rotary evaporator so as to obtain a solution at the total noble metal concentration of 2.73% by weight (Pt: 2.57% by weight, Pd: 0.16% by weight).

On the other hand, 24 g of $\gamma$-$Al_2O_3$ powder was dispersed in 300 g of water. Then 10.5 g of the above solution was added to this and stirred for 30 minutes and filtered. After dried at 110° C. for two hours, this material was calcined at 450° C. for two hours, thereby obtaining a Pt—Pd composite colloid-loaded catalyst. The amounts of noble metals loaded were $6.4 \times 10^{-5}$ mol in total of Pt and Pd with respect to 1 g of $\gamma$-$Al_2O_3$ powder.

REFERENCE EXAMPLE 14

0.591 g of $PtCl_4$ ($5H_2O$), 0.0405 g of $RhCl_3$ ($3H_2O$) and 0.89 g of polyvinyl pyrrolidone with a number average molecular weight of 25,000 were mixed in 400 g of water and stirred to prepare a uniform aqueous solution. 100 g of ethanol was added to this aqueous solution and the mixture was treated at reflux at 90° C. for two hours, thereby obtaining a Pt—Rh composite colloidal solution (Pt: 90 mol %, Rh: 10 mol %). This colloidal solution was concentrated by using a rotary evaporator so as to obtain a solution at the total noble metal concentration of 2.17% by weight (Pt: 2.05% by weight, Rh: 0.12% by weight).

On the other hand, 24 g of $\gamma$-$Al_2O_3$ powder was dispersed in 300 g of water and 13.17 g of the above solution was added to this and stirred for 30 minutes and filtered. After dried at 110° C. for two hours, this material was calcined at 450° C. for two hours, thereby obtaining a Pt—Rh composite colloid-loaded catalyst. The amounts of noble metals loaded were $6.4 \times 10^{-5}$ mol in total of Pt and Rh with respect to 1 g of $\gamma$-$Al_2O_3$ powder.

REFERENCE EXAMPLE 15

A Pt—Rh composite colloidal solution (Pt: 80 mol %, Rh: 20 mol %) was obtained in the same way as that of Reference Example 14 except that the amounts of $PtCl_4$ ($5H_2O$) and $RhCl_3$ ($3H_2O$) added were different from those of Reference Example 14. This colloidal solution was concentrated by using a rotary evaporator in the same way as in Reference Example 14, and the colloid was loaded in the same way as in Reference Example 14, thereby obtaining a Pt—Rh composite colloid-loaded catalyst. The amounts of noble metals loaded were $6.4 \times 10^{-5}$ mol in total of Pt and Rh with respect to 1 g of $\gamma$-$Al_2O_3$ powder.

REFERENCE EXAMPLE 16

A Pt—Rh composite colloidal solution (Pt: 70 mol %, Rh: 30 mol %) was obtained in the same way as that of Reference Example 14 except that the amounts of $PtCl_4$ ($5H_2O$) and $RhCl_3$ ($3H_2O$) added were different from those of Reference Example 14. This colloidal solution was concentrated by using a rotary evaporator in the same way as in Reference Example 14, and the colloid was loaded in the same way as in Reference Example 14, thereby obtaining a Pt—Rh composite colloid-loaded catalyst. The amounts of noble metals loaded were $6.4 \times 10^{-5}$ mol in total of Pt and Rh with respect to 1 g of $\gamma$-$Al_2O_3$ powder.

REFERENCE EXAMPLE 17

A Pt—Rh composite colloidal solution (Pt: 60 mol %, Rh: 40 mol %) was obtained in the same way as that of Reference Example 14 except that the amounts of $PtCl_4$ ($5H_2O$) and $RhCl_3$ ($3H_2O$) added were different from those of Reference Example 14. This colloidal solution was concentrated by using a rotary evaporator in the same way as in Reference Example 14, and the colloid was loaded in the same way as in Reference Example 14, thereby obtaining a Pt—Rh composite colloid-loaded catalyst. The amounts of noble metals loaded were $6.4 \times 10^{-5}$ mol in total of Pt and Rh with respect to 1 g of $\gamma$-$Al_2O_3$ powder.

REFERENCE EXAMPLE 18

A Pt—Rh composite colloidal solution (Pt: 50 mol %, Rh: 50 mol %) was obtained in the same way as that of Reference Example 14, except that the amounts of $PtCl_4$ ($5H_2O$) and $RhCl_3$ ($3H_2O$) added were different from those of Reference Example 14. This colloidal solution was concentrated by using a rotary evaporator in the same way as in Reference Example 14, and the colloid was loaded in the same way as in Reference Example 14, thereby obtaining a Pt—Rh composite colloid-loaded catalyst. The amounts of noble metals loaded were $6.4 \times 10^{-5}$ mol in total of Pt and Rh with respect to 1 g of $\gamma$-$Al_2O_3$ powder.

REFERENCE EXAMPLE 19

A Pt—Rh composite colloidal solution (Pt: 40 mol %, Rh: 60 mol %) was obtained in the same way as that of Reference Example 14, except that the amounts of PtCl$_4$ (5H$_2$O) and RhCl$_3$ (3H$_2$O) added were different from those of Reference Example 14. This colloidal solution was concentrated by using a rotary evaporator in the same way as in Reference Example 14, and the colloid was loaded in the same way as in Reference Example 14, thereby obtaining a Pt—Rh composite colloid-loaded catalyst. The amounts of noble metals loaded were 6.4×10$^{-5}$ mol in total of Pt and Rh with respect to 1 g of γ-Al$_2$O$_3$ powder.

REFERENCE EXAMPLE 20

A Pt—Rh composite colloidal solution (Pt: 30 mol %, Rh: 70 mol %) was obtained in the same way as that of Reference Example 14, except that the amounts of PtCl$_4$ (5H$_2$O) and RhCl$_3$ (3H$_2$O) added were different from those of Reference Example 14. This colloidal solution was concentrated by using a rotary evaporator in the same way as in Reference Example 14, and the colloid was loaded in the same way as in Reference Example 14, thereby obtaining a Pt—Rh composite colloid-loaded catalyst. The amounts of noble metals loaded were 6.4×10$^{-5}$ mol with respect to 1 g of γ-Al$_2$O$_3$ powder.

REFERENCE EXAMPLE 21

A Pt—Rh composite colloidal solution (Pt: 20 mol %, Rh: 80 mol %) was obtained in the same way as that of Reference Example 14, except that the amounts of PtCl$_4$ (5H$_2$O) and RhCl$_3$ (3H$_2$O) added were different from those of Reference Example 14. This colloidal solution was concentrated by using a rotary evaporator in the same way as in Reference Example 14 and the colloid was loaded in the same way as in Reference Example 14, thereby obtaining a Pt—Rh composite colloid-loaded catalyst. The amounts of noble metals loaded were 6.4×10$^{-5}$ mol with respect to 1 g of γ-Al$_2$O$_3$ powder.

REFERENCE EXAMPLE 22

A Pt—Rh composite colloidal solution (Pt: 10 mol %, Rh: 90 mol %) was obtained in the same way as that of Reference Example 14, except that the amounts of PtCl$_4$ (5H$_2$O) and RhCl$_3$ (3H$_2$O) added were different from those of Reference Example 14. This colloidal solution was concentrated by using a rotary evaporator in the same way as in Reference Example 14 and the colloid was loaded in the same way as in Reference Example 14, thereby obtaining a Pt—Rh composite colloid-loaded catalyst. The amounts of noble metals loaded were 6.4×10$^{-5}$ mol in total of Pt and Rh with respect to 1 g of γ-Al$_2$O$_3$ powder.

CONVENTIONAL EXAMPLE 2

24 g of γ-Al$_2$O$_3$ powder was introduced into 500 g of a nitric acid solution including platinum dinitrodiamine complex and palladium nitrate (Pt: 0.27 g (90 mol %), Pd: 0.164 g (10 mol %)) and the mixture was stirred for fifteen minutes and filtered. After dried at 110° C. for two hours, this material was calcined at 450° C. for two hours, thereby obtaining a catalyst of Conventional Example 2. The amounts of Pt and Pd loaded were the same as those of Reference Example 13.

CONVENTIONAL EXAMPLES 3 TO 11

500 g of a nitric acid solution including platinum dinitrodiamine complex and rhodium nitrate was prepared so that the total mole of Pt and Rh was 0.00154 mol and the molar ratios of Pt and Rh in the respective comparative examples were those shown in Table 2. Then 24 g of γ-Al$_2$O$_3$ powder was introduced therein. The mixtures were stirred for fifteen minutes and filtered. After dried at 110° C. for two hours, these materials were calcined at 450° C. for two hours, thereby obtaining catalysts of Conventional Examples 3 to 11. The amounts of Pt and Rh loaded were the same as those of the catalysts of Reference Examples 14 to 22, i.e., 6.4×10$^{-5}$ mol in total of Pt and Rh with respect to 1 g of γ-Al$_2$O$_3$ powder.

TABLE 2

| | | Pt | Rh |
|---|---|---|---|
| Conventional | 3 | 10 mol % | 90 mol % |
| Example | 4 | 20 mol % | 80 mol % |
| | 5 | 30 mol % | 70 mol % |
| | 6 | 40 mol % | 60 mol % |
| | 7 | 50 mol % | 50 mol % |
| | 8 | 60 mol % | 40 mol % |
| | 9 | 70 mol % | 30 mol % |
| | 10 | 80 mol % | 20 mol % |
| | 11 | 90 mol % | 10 mol % |

<Experiment 3>

Figure 9:
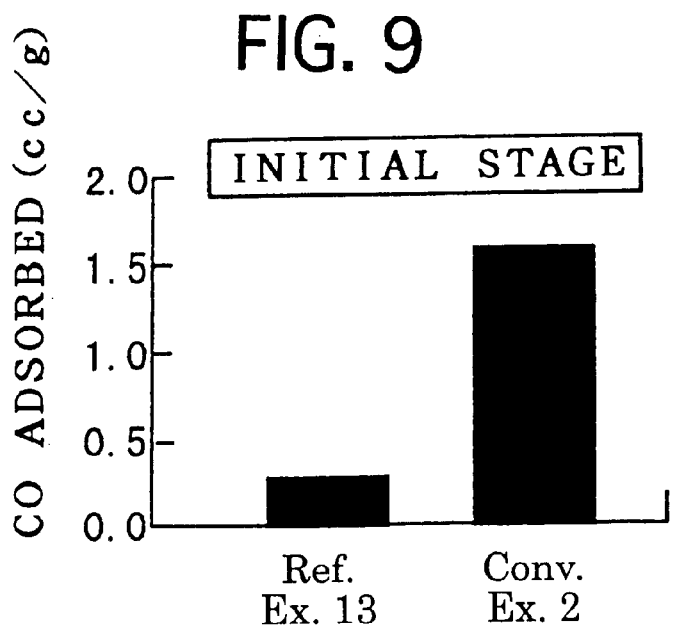
FIG. 9 is a graph showing the amounts of CO adsorbed to the catalysts of Reference Example 13 and the catalyst of Conventional Example 2 in the initial stage.
Figure 10:
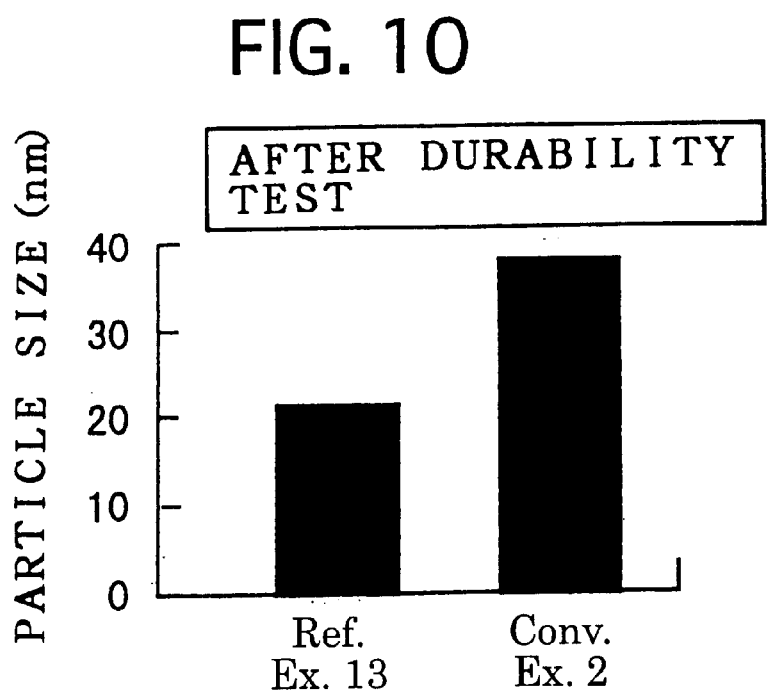
FIG. 10 is a graph showing the Pt particle size of the catalyst of Reference Example 13 and the catalyst of Conventional Example 2 after a durability test.
Figure 11:
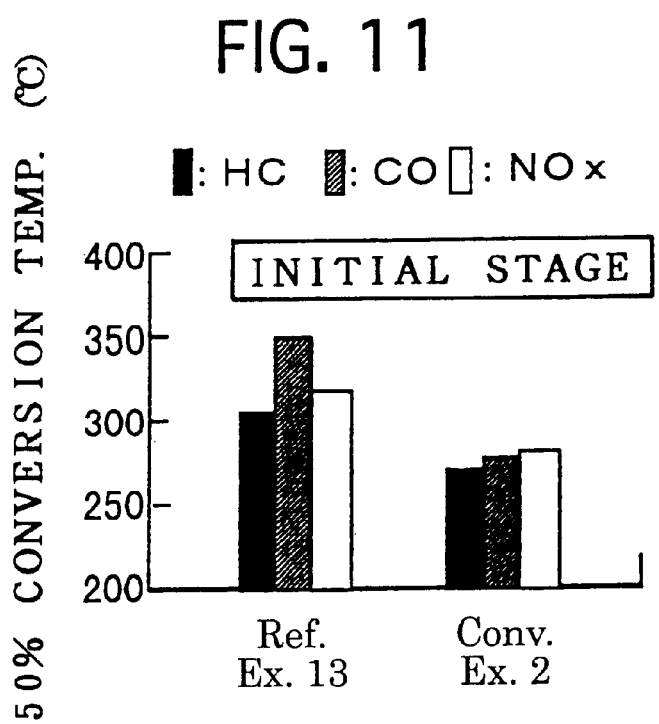
FIG. 11 is a graph showing 50% conversion temperatures of the catalyst of Reference Example 13 and the catalyst of Conventional Example 2 in the initial stage.
Figure 12:
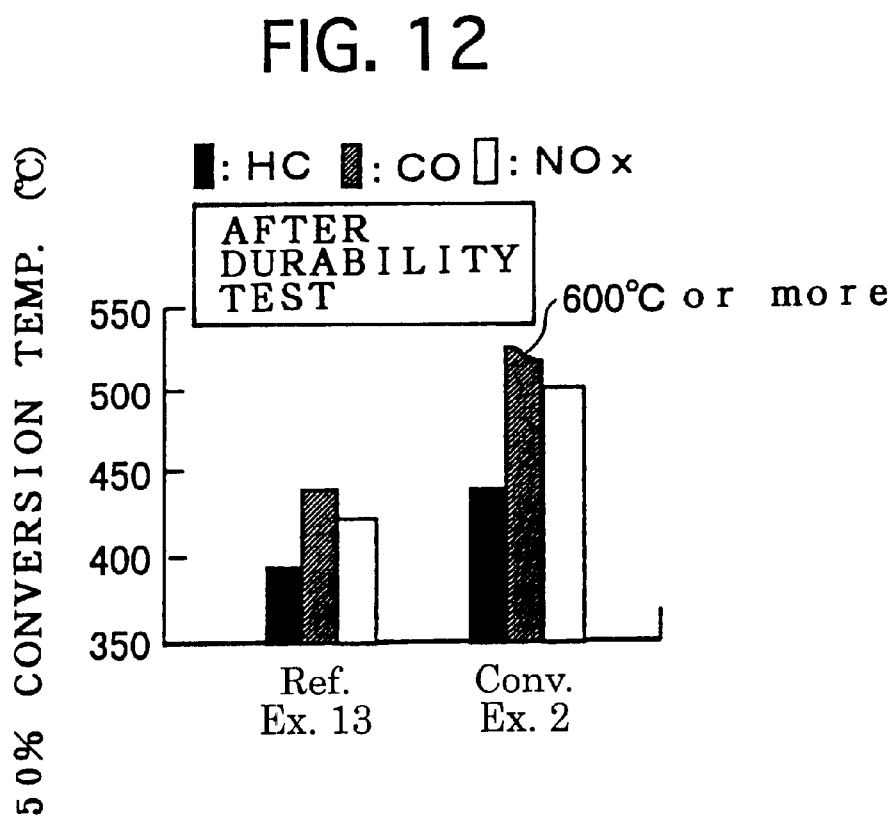
FIG. 12 is a graph showing 50% conversion temperatures of the catalyst of Reference Example 13 and the catalyst of Conventional Example 2 after the durability test.

The dispersion degree of the noble metals in the catalysts of Reference Example 13 and Conventional Example 2 were respectively measured by the CO pulse method, and the results are presented in FIG. 9. These respective catalysts were subjected to a durability test in the same way as in Experiment 1. FIG. 10 shows the particle size of the noble metals after the durability test, measured by the X-ray diffraction method. The 50% conversion temperatures of these catalyst in the initial stage and after the durability test were measured respectively and the results are shown in FIGS. 11 and 12.

<Evaluation>

It is apparent from FIG. 9 that the catalyst of Reference Example 13 in the initial stage had a smaller amount of CO adsorbed and a lower dispersion degree of noble metal particle that is to say, a larger noble metal particle size, when compared with the catalyst of Conventional Example 2 in the initial stage. When the catalysts of Reference Example 13 and Conventional Example 2 in the initial stage were analyzed by the X-ray diffraction method, the catalyst of Reference Example 13 had a noble metal particle size of 3.2 nm and on the other hand, it was difficult to measure the noble metal particle size of Conventional Example 2 because the noble metals were loaded in the atomic state.

FIG. 10 demonstrates that after the durability test the catalyst of Reference Example 13 had a smaller noble metal particle size than the catalyst of Conventional Example 2 and that the grain growth of noble metals by the durability test was suppressed in the catalyst of Reference Example 13.

It is also seen from FIGS. 11 and 12 that the catalyst of Reference Example 13 had a remarkably smaller decrease in the conversion ability after the durability test than the catalyst of Conventional Example 2, and that the catalyst of Reference Example 13 exhibited a superb conversion ability in the initial stage. This is supposed to be an effect of loading the noble metals as a composite noble metal colloid.

<Experiment 4>

The noble metal particle size of the catalysts of Reference Examples 14 to 22 in the initial stage were measured by the X-ray diffraction method. The results are summarized in FIG. 13 with the mol % of Rh on the axis of abscissas. The catalysts of Reference Examples 14 to 22 and the catalysts of Conventional Examples 3 to 11 were subjected to a durability test in the same way as in Experiment 1, and the noble metal particle size of the respective catalysts after the durability test were measured by the X-ray diffraction method. The results are shown in FIG. 14.

The 50% conversion temperatures of the catalysts of Reference Examples 14 to 22 in the initial stage and after the durability test and the 50% conversion temperatures of the catalysts of Conventional Examples 3 to 11 after the durability test were measured respectively in the same way as in Experiment 2. The results are respectively presented in FIGS. 15 to 17. It should be noted that FIG. 15 also shows the result of Reference Example 4 on which only the Pt colloid was loaded, and that FIG. 17 also shows the result of Conventional Example 1 on which only Pt was loaded.

<Evaluation>

Figure 13:
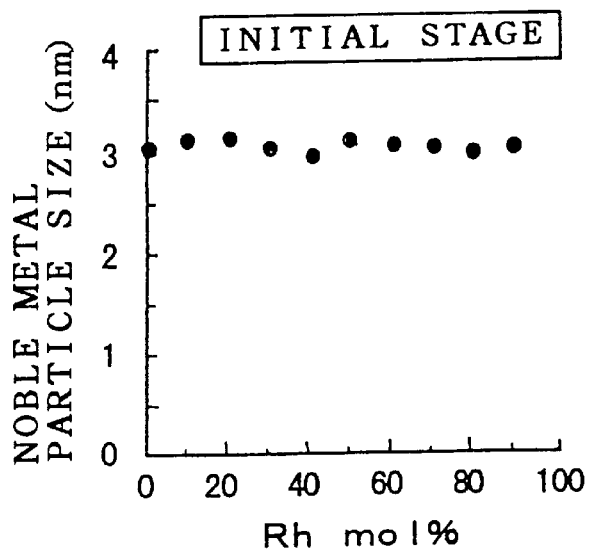
FIG. 13 is a graph showing the relation between the amounts of Rh and the particle size of noble metal colloids of the catalysts of Reference Examples 14 to 22 in the initial stage.
Figure 14:
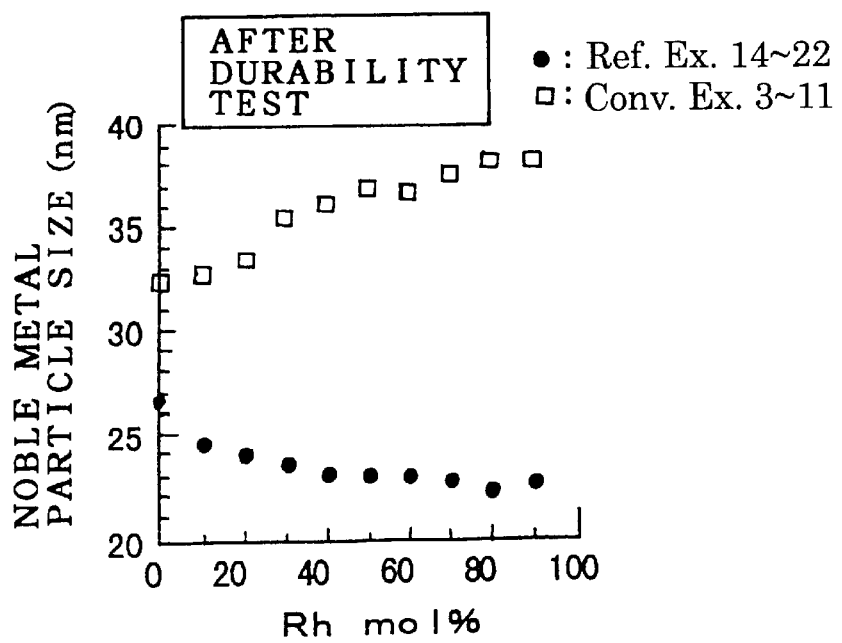
FIG. 14 is a graph showing the relation between the amounts of Rh and the particle size of noble metal colloids of the catalysts of Reference Examples 14 to 22 and the catalysts of Conventional Examples 3 to 11 after a durability test.

As apparent from FIG. 13, the initial noble metal particle size of the catalysts of Reference Examples 14 to 22 were constantly about 3 nm regardless of the amount of Rh loaded. On the other hand, the initial noble metal particle sizes of Conventional Examples 3 to 11 were too small to be measured by the X-ray diffraction method and the noble metals were loaded in the atomic state.

As evident from FIG. 14, the catalysts of Reference Examples 14 to 22 had smaller noble metal particle size after the durability test than the catalysts of Conventional Examples 3 to 11; that is to say, grain growth of noble metals were suppressed and the effect of Rh was gradually stronger as the amount of Rh loaded was larger. As seen from the comparison of FIGS. 16 and 17, the catalysts of Reference Examples 14 to 22 had superior conversion ability after the durability test than those of Conventional Examples 3 to 11. This is supposed to be the effect of the suppression of the noble metals grain growth.

Figure 15:
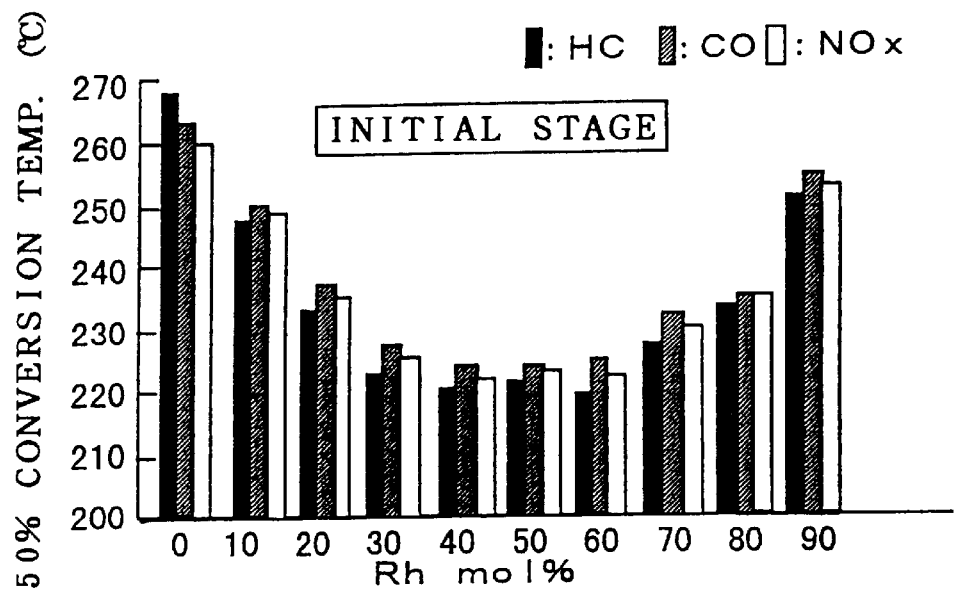
FIG. 15 is a graph showing 50% conversion temperatures of the catalysts of Reference Examples 14 to 22 and the catalyst of Reference Example 4 in the initial stage.
Figure 16:
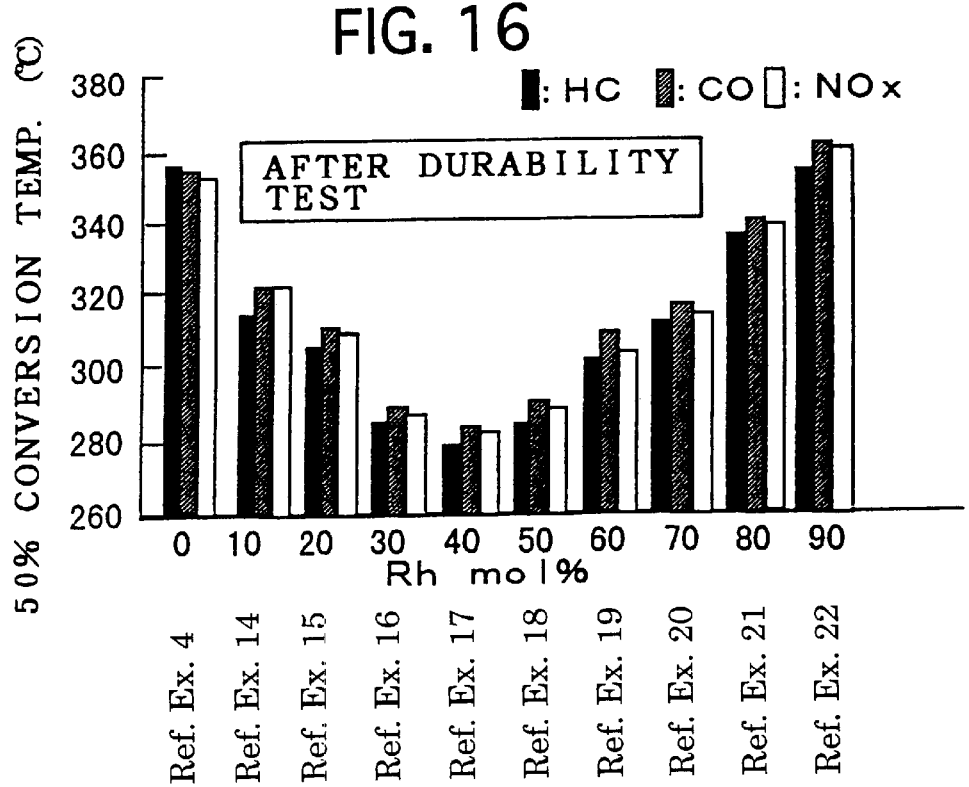
FIG. 16 is a graph showing 50% conversion temperatures of the catalysts of Reference Examples 14 to 22 and the catalyst of Reference Example 4 after the durability test.
Figure 17:
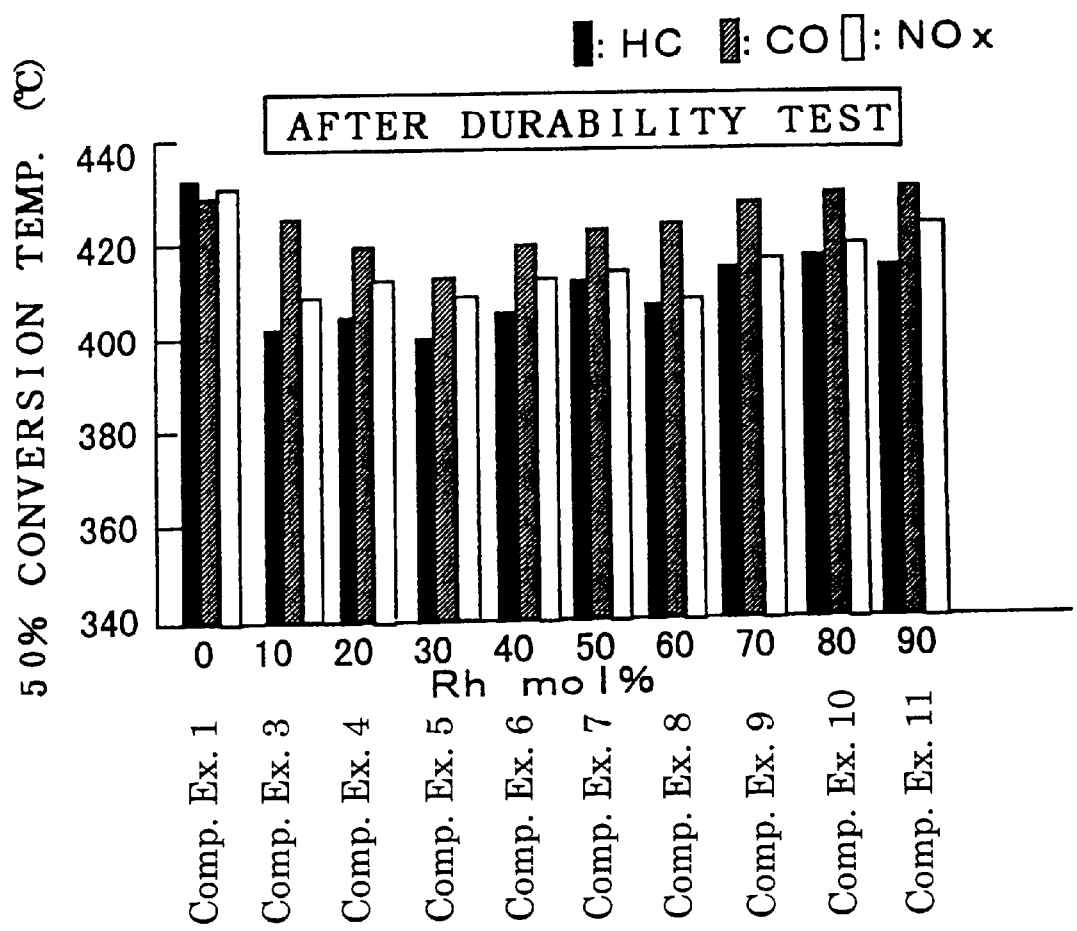
FIG. 17 is a graph showing 50% conversion temperatures of the catalysts of Conventional Examples 3 to 11 and the catalyst of Conventional Example 1 after the durability test.

On the other hand, the comparison of FIGS. 15 to 17 indicates that the catalysts of Reference Examples 14 to 22 had high conversions both in the initial stage and after the durability test, i.e., exhibited superior durability to the catalysts of Conventional Examples 3 to 11. This is supposed to be an effect of loading Pt and Rh as a composite colloid. Especially the catalysts of Reference Examples 14 to 21 containing 10 to 80 mol % of Rh had higher activity than the catalyst of Reference Example 4 which was a Pt colloid-loaded catalyst. Evidently, this is also an effect of loading Pt and Rh as a composite colloid.

Especially when the Rh amount was in the range of 30 to 50 mol %, the 50% conversion temperatures were less than 300° C. even after the durability test, which means excellent durability.

REFERENCE EXAMPLE 23

Figure 18:
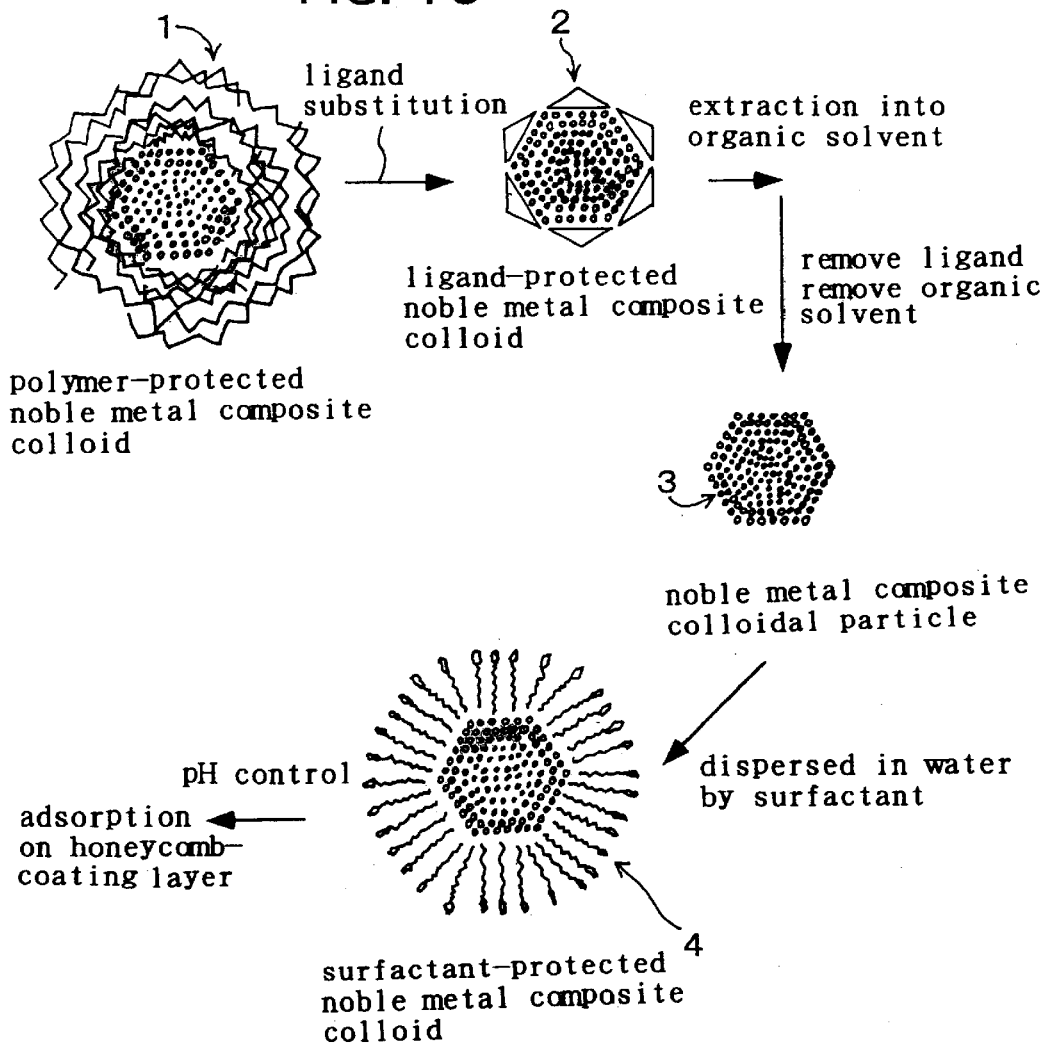
FIG. 18 is a schematic explanatory view of the change of colloidal particles in the production method of Reference Example 23.

FIG. 18 shows schematic explanatory views showing the change of colloidal particles in the production method of this reference example.

<Preparation of a Polymer-Protected Noble Metal Composite Colloidal Solution>

93.9 g of polyvinyl pyrrolidone was dissolved into 7700 g of water to prepare a uniform solution. 159.40 g of a chloroplatinic acid aqueous solution at a Pt concentration of 15.056% by weight, 117.80 g of a rhodium chloride aqueous solution at a Rh concentration of 4.606% by weight and 2000 g of ethanol were added to this solution and stirred for one hour, thereby preparing a uniform solution.

This solution was heated and after ethanol started reflux, the reflux was continued by heating for eight hours, thereby obtaining a dark brown solution. This solution was concentrated by using a rotary evaporator, thereby obtaining paste. Water was added to this paste to dissolve the paste again, thereby preparing a solution in which a polymer-protected noble metal composite 1 was uniformly dispersed in water. The respective noble metal concentrations of this aqueous solution were measured by ICP (introductively coupled plasma spectrometry). The Pt was 5.12% by weight and the Rh was 1.16% by weight (Pt: 70.0 mol %, Rh: 30.0 mol %).

<Ligand Substitution>

To prepare a uniform aqueous solution, 800 g of water was added to 6.51 g of the obtained polymer-protected noble metal composite colloid aqueous solution which contained 2.44 mmol in total of the noble metals. The whole of this aqueous solution, and a solution of 9.61 g (36.6 mmol, fifteen times of the total amount of noble metals) of triphenyl phosphine $((C_6H_5)_3P)$ was dissolved in 1000 g of toluene were introduced into a separating funnel. The funnel was vigorously shaken for one hour and then left quiet for 24 hours. Thus the content was separated into a transparent water layer (a lower layer) and a black flocculent substance-floating organic layer (an upper layer). So, the water layer was removed.

Then 800 g of water was added to the remaining organic layer and the mixture was vigorously shaken for fifteen minutes and then left quiet and the separated water layer was removed. This water cleansing step was carried out five times in order to remove water-soluble impurities. The obtained material was a ligand-protected noble metal composite colloid 2 shown in FIG. 18. Then, 200 g of acetone was added to this colloid, shaken vigorously and left quiet. Since black powdery substance deposited, the liquid layer was removed quietly. This acetone cleansing step was repeated five times so as to remove acetone-soluble impurities. The black powdery substance thus obtained was transferred into a 100 ml reagent bottle. 50 g of acetone was added into the bottle and treated by an ultrasonic cleaner for 10 minutes. Then acetone as the supernatant liquid was removed quietly. This ultrasonic cleansing step was repeated two times, thereby obtaining noble metal composite colloidal particles 3.

<Protection by a Surfactant>

While an ultrasonic treatment was applied to the obtained noble metal composite colloidal particles, 1.06 g of sodium lauryl sulfate $(CH_3(CH_2)_{11}OSO_3Na)$ as an anionic surfactant was added to the colloidal particles and at the same time water was added until it becomes a solution in which noble metal composite colloidal particles were uniformly dispersed in water. Thus, a solution was prepared in which a surfactant-protected noble metal composite colloid 4 was uniformly dispersed. The respective noble metal concentrations of this solution were measured by the ICP. Pt was 0.64% by weight and Rh was 0.15% by weight. This solution was a pure uniform solution which didn't give sediment even after left for one month at room temperature.

REFERENCE EXAMPLE 24

A surfactant-protected noble metal composite colloidal solution was prepared in the same way as that of Reference Example 23 except that 0.97 g of lauryl trimethyl ammonium chloride $([CH_3(CH_2)_{11}N(CH_3)_3]Cl)$ as a cationic surfactant was used instead of sodium lauryl sulfate. The respective noble metal concentrations of this solution were measured by the ICP. Pt was 0.74% by weight and Rh was 0.17% by weight. This solution was a pure uniform solution which didn't give sediment even after left for one month at room temperature.

REFERENCE EXAMPLE 25

A surfactant-protected noble metal composite colloidal solution was prepared in the same way as that of Reference Example 23 except that 1.40 g of polyethylene glycol lauryl ether $(CH_3(CH_2)_{11}(OCH_2CH_2)_nOH, n \approx 9)$ as a nonionic surfactant was employed instead of sodium lauryl sulfate. The respective noble metal concentrations of this solution were measured by the IPC. Pt was 0.71% by weight and Rh was 0.16% by weight. This solution was a pure uniform solution which didn't give sediment even after left for one month at room temperature.

REFERENCE EXAMPLE 26

A surfactant-protected noble metal composite colloidal solution was prepared in the same way as that of Reference Example 23, except that 0.63 g of β-N-lauryl amino propionic acid ($CH_3(CH_2)_{11}NH_2CH_2CH_2COOH$) as an amphoteric surfactant was employed instead of sodium lauryl sulfate. The respective noble metal concentrations of this solution were measured by the IPC. Pt was 0.68% by weight and Rh was 0.15% by weight. This solution was a pure uniform solution which didn't give sediment even after left for one month at room temperature.

REFERENCE EXAMPLE 27

The Pt—Rh composite colloidal solution (Pt: 90 mol %, Rh: 10 mol %) synthesized in Reference Example 14 was regarded as Reference Example 27. This colloidal solution was a polymer-protected noble metal composite colloidal solution.

<Experiment 5>

The colloidal solutions of Reference Examples 23 to 27 were diluted with water to contain 0.050 g of Pt and 0.011 g of Rh. The pH of the solutions were controlled as shown in Table 3 by using nitric acid or aqueous ammonia, if necessary.

On the other hand, test pieces were prepared by coating 0.43 g of each porous oxide support powder of $\gamma$-$Al_2O_3$ powder, $TiO_2$ powder and $ZrO_2$ powder on a honeycomb-shaped monolith supporting base material formed of cordierite and having a diameter of 30 mm, a height of 50 mm and a capacity of 35.5 ml. The test pieces were respectively immersed in 70 ml of the above solutions. Then time to decrease the noble metal concentration of the supernatant to one hundredth of the initial values was respectively measured and the results are shown in Table 3. The measurement was done at one hour intervals from 0 to 12 hours and 12 hours intervals after 12 hours. When the solutions were short, the solutions were synthesized again by the respective methods of Examples and Comparative Examples.

<Evaluation>

TABLE 3

| | | TIME TO DECREASE CONCENTRATION TO 1/100 OR LESS (hr) | | |
|---|---|---|---|---|
| | pH | ALUMINA SUPPORT | TITANIA SUPPORT | ZIRCONIA SUPPORT |
| Ref. Ex. 23 | 4 | 3 | 4 | 4 |
| Ref. Ex. 24 | 10 | 4 | 5 | 5 |
| Ref. Ex. 25 | 4 | 7 | 8 | 8 |
| Ref. Ex. 25 | 7 | 7 | 8 | 8 |
| Ref. Ex. 25 | 10 | 7 | 8 | 8 |
| Ref. Ex. 26 | 4 | 3 | 4 | 4 |
| Ref. Ex. 26 | 7 | 6 | 7 | 7 |
| Ref. Ex. 26 | 10 | 3 | 4 | 4 |
| Ref. Ex. 27 | 4 | 60 | 72 | 72 |
| Ref. Ex. 27 | 7 | 60 | 72 | 72 |
| Ref. Ex. 27 | 10 | 60 | 72 | 72 |

It is appreciated from Table 3 that the respective colloidal solutions of Reference Examples 23 to 26 were remarkably improved in the adsorption rate of the noble metal composite colloid on the support when compared with the colloidal solution of Reference Example 27. It is evident that the adsorption ability of the noble metal composite colloid on the support was greatly improved by using a surfactant-protected noble metal composite colloidal solution instead of a polymer-protected noble metal composite colloidal solution.

Moreover, it is apparent that in the case of employing such an amphoteric surfactant as that of Reference Example 26, the adsorption rates of the noble metal composite colloid were changed by pH control. It is also apparent that the adsorption rates could be improved by changing the electrostatic characteristics of the colloidal surface.

It is also seen from the different adsorption rates depending on the kind of supports that when the production method of the present invention was carried out by using a support mixture comprising plural kinds of powdery supports, different kinds of noble metals could be loaded easily in accordance with the kind of supports.

EXAMPLE 1

Figure 19:
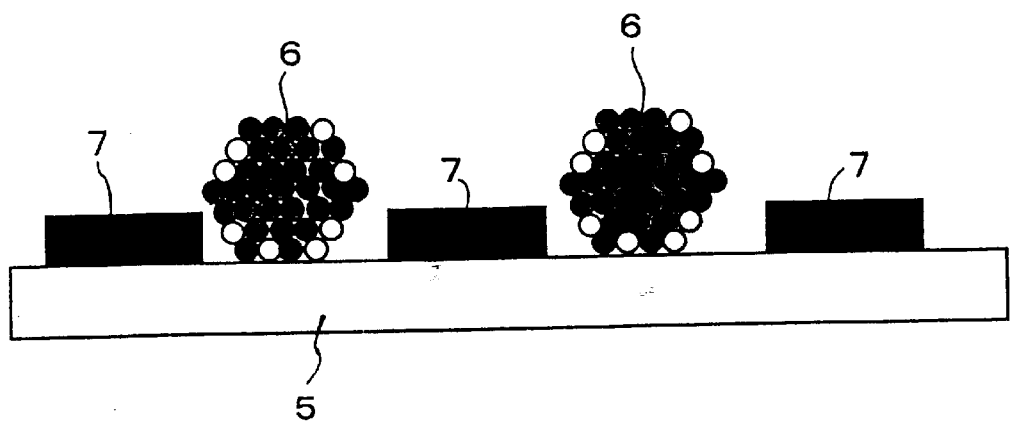
FIG. 19 is an explanatory view showing the structure of the catalyst of Example 1 schematically.

FIG. 19 schematically shows an exhaust-gases-purifying catalyst of this example. This catalyst comprises alumina 5 as a porous oxide support, a Pt—Rh composite colloid 6 loaded on the alumina 5, and barium carbonate 7 as an $NO_x$ storage component loaded on the alumina 5.

Hereinafter, the production method of this catalyst will be explained instead of giving detailed description of the arrangement.

First, 40 g of $\gamma$-$Al_2O_3$ was dispersed in water and 17.03 g of barium acetate was added therein. The mixture was concentrated and dried into solids, thereby preparing barium acetate-loaded alumina. 51.33 g of this barium acetate-loaded alumina was collected, calcined at 550° C. for two hours and then mixed in a solution of 4.3 g ammonium hydrogen carbonate in 300 g water and stirred for fifteen minutes. Then the resultant material was filtered under reduced pressure and dried, thereby preparing barium carbonate-loaded alumina.

Next, the barium carbonate-loaded alumina was dispersed in 300 g of water. A Pt—Rh composite colloidal solution (Pt: 90 mol %, Rh: 10 mol %) separately prepared was added to this so that the total mole of Pt and Rh became $3.42 \times 10^{-3}$ mol. The mixture was stirred for 30 minutes and then filtered to collect powder. This powder was dried at 110° C. for two hours and calcined at 450° C. for two hours, thereby preparing catalyst powder of this example. The total concentration of Pt and Rh loaded was $9.40 \times 10^{-5}$ mol with respect to 1 g of alumina powder, and the concentration of Ba loaded was $1.67 \times 10^{-3}$ mol with respect to 1 g of alumina powder. This catalyst powder was shaped into pellets having particle size of 1 to 3 mm and subjected to experiments mentioned later.

EXAMPLE 2

A pellet catalyst of Example 2 was prepared in the same way as that of Example 1, except for the use of a Pt—Rh composite colloidal solution having a different Pt—Rh ratio (Pt: 70 mol %, Rh: 30 mol %).

EXAMPLE 3

A pellet catalyst of Example 3 was prepared in the same way as that of Example 1, except for the use of a Pt—Rh composite colloidal solution having a different Pt—Rh ratio (Pt: 50 mol %, Rh: 50 mol %).

COMPARATIVE EXAMPLE 1

Figure 20:
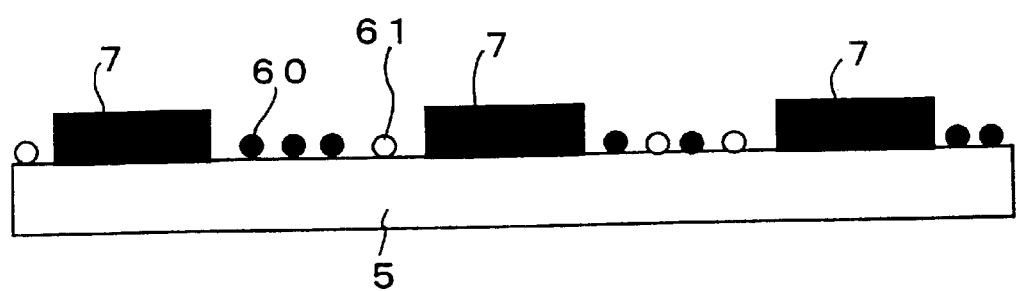
FIG. 20 is an explanatory view showing the structure of the catalyst of Comparative Example 1 schematically.

FIG. 20 schematically shows a catalyst of Comparative Example 1. This catalyst comprises alumina 5 as a porous oxide support, Pt 60 and Rh 61 which were loaded on the alumina 5 and highly dispersed on an atomic level, and barium carbonate 7 as an $NO_x$ storage component loaded on the alumina 5.

This catalyst was produced in the same way as that of Example 1, except that a mixed solution of platinum dinitrodiamine complex and rhodium nitrate was used instead of the Pt—Rh composite colloidal solution (Pt: 90 mol %, Rh: 10 mol %). The concentrations of Pt and Rh loaded were the same as those of Example 1.

COMPARATIVE EXAMPLE 2

A pellet catalyst of Comparative Example 2 was prepared in the same way as that of Example 2, except that a mixed solution of platinum dinitrodiamine complex and rhodium nitrate was used instead of the Pt—Rh composite colloidal solution (Pt: 70 mol %, Rh: 30 mol %). The concentrations of Pt and Rh loaded were the same as those of Example 2.

COMPARATIVE EXAMPLE 3

A pellet catalyst of Comparative Example 3 was prepared in the same way as that of Example 3, except that a mixed solution of platinum dinitrodiamine complex and rhodium nitrate was used instead of the Pt—Rh composite colloidal solution (Pt: 50 mol %, Rh: 50 mol %). The concentrations of Pt and Rh loaded were the same as those of Example 3.

<Experiment 6>

Figure 21:
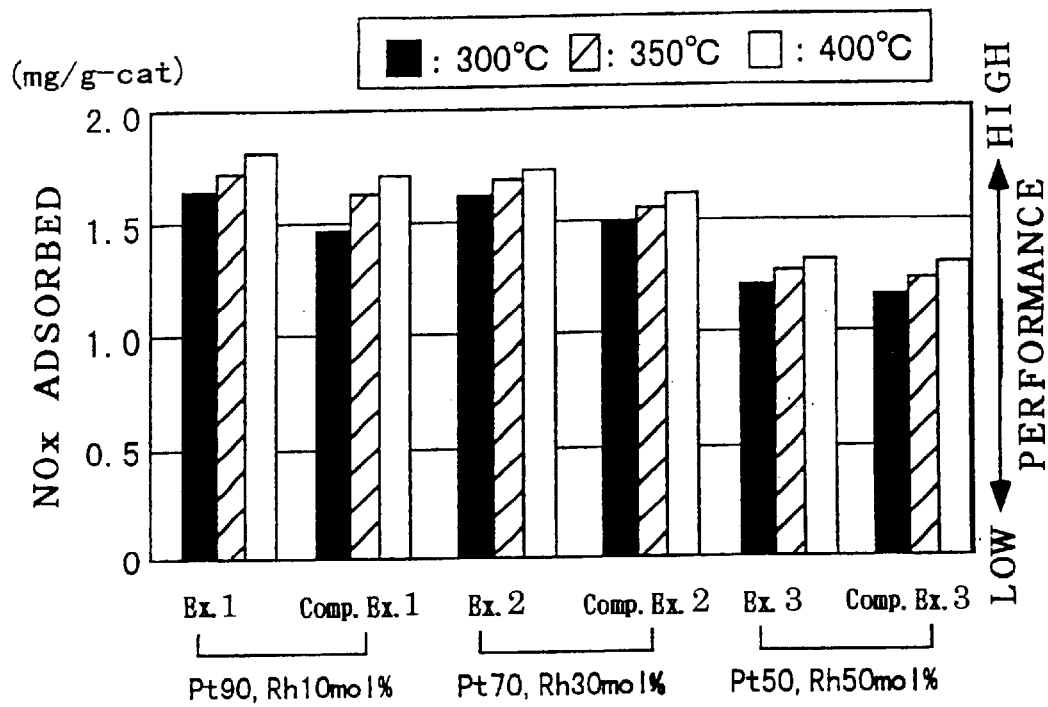
FIG. 21 is a graph showing the amounts of $NO_x$ adsorbed to the catalysts of Examples 1 to 3 and Comparative Examples 1 to 3 in the initial stage.

The pellet catalysts of Examples 1 to 3 and Comparative Examples 1 to 3 were respectively placed in laboratory reactors and a model exhaust gas with the composition shown in Table 4 was introduced at a space velocity of 100,000 $h^{-1}$. Specifically speaking, the constant fuel-lean gas supply was switched to the fuel-rich gas supply for five seconds, and then returned to the fuel-lean gas supply. Three kinds of catalyst bed temperatures, 300° C., 350° C. and 400° C. were selected, and at each temperature the amount of $NO_x$ adsorbed was measured after a fuel-rich spike (the fuel-rich gas was introduced for five seconds and then the fuel-lean gas was introduced again). The results are shown in FIG. 21.

A durability test was carried out by calcining the respective catalysts at 700° C. for ten hours in the air. These catalysts after the durability test were examined about the amount of $NO_x$ adsorbed in the same way as above. The results are presented in FIG. 22.

TABLE 4

| | $H_2$ (%) | NO (ppm) | $C_3H_6$ (ppm) | $CO_2$ (%) | CO (ppm) | $O_2$ (%) | $H_2O$ (%) | $N_2$ |
|---|---|---|---|---|---|---|---|---|
| FUEL-LEAN GAS | 0 | 800 | 1800 | 11.0 | 0 | 7 | 3 | balance |
| FUEL-RICH GAS | 0.15 | 10 | 1000 | 11.0 | 6000 | 0 | 3 | balance |

Figure 23:
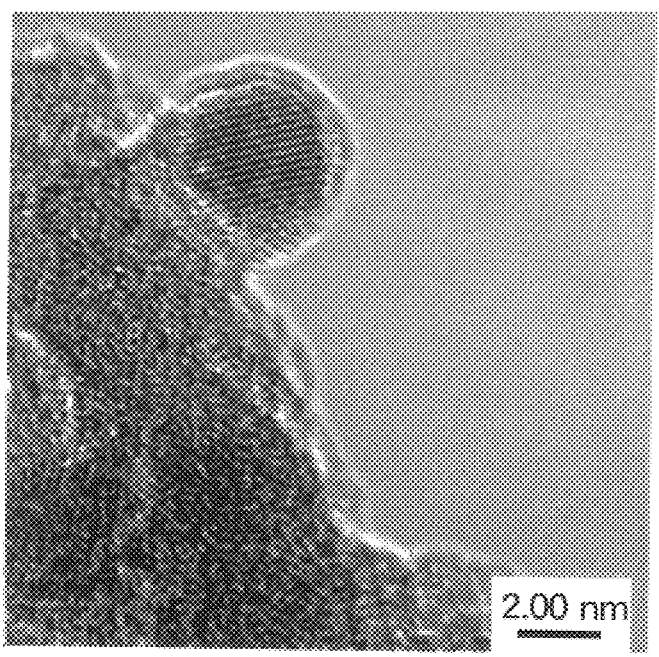
FIG. 23 is an electromicroscopic photograph showing the particle structure of the catalyst of Example 1 in the initial stage.
Figure 24:
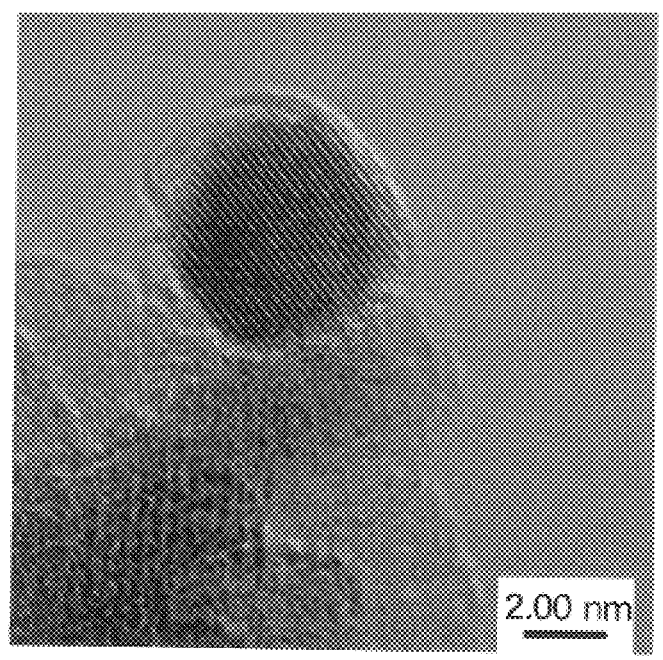
FIG. 24 is an electromicroscopic photograph showing the particle structure of the catalyst of Example 1 after the durability test.
Figure 25:
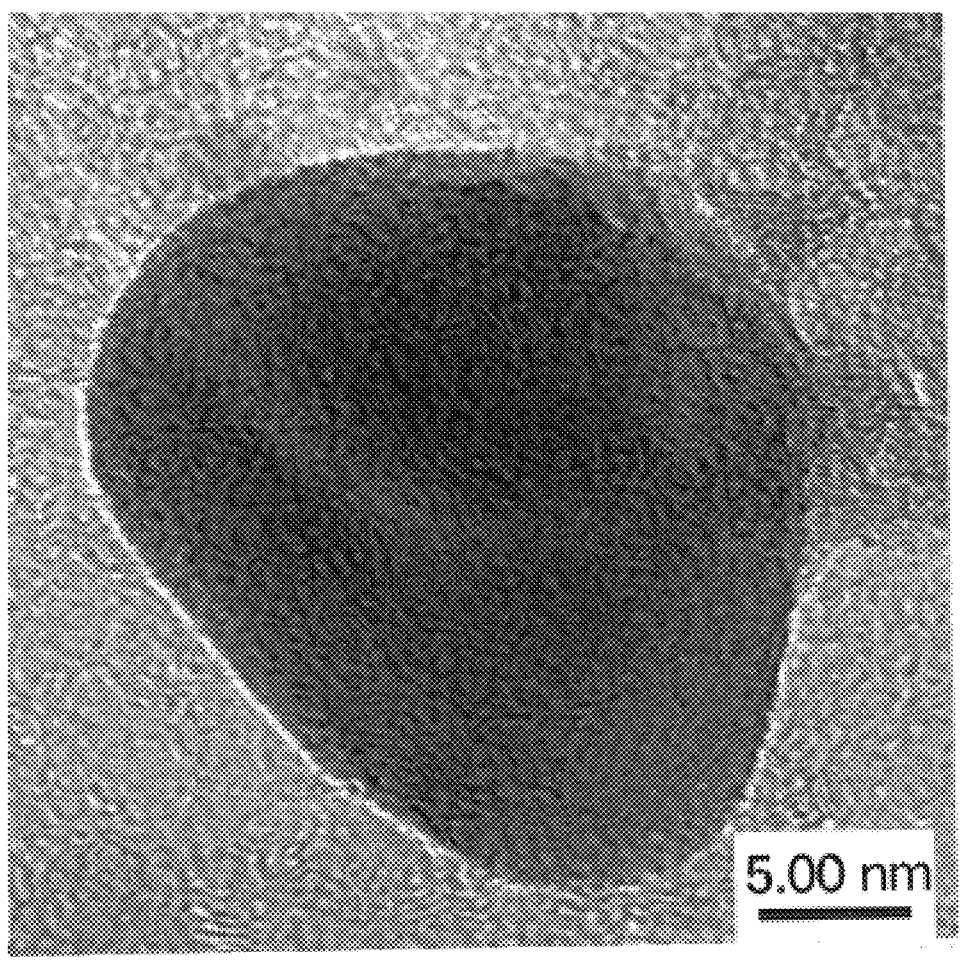
FIG. 25 is an electromicroscopic photograph showing the particle structure of the catalyst of Comparative Example 1.

Moreover, regarding the catalysts of Example 1 and Comparative Example 1, the shape of noble metal particles before and after the durability test were observed through an electron microscope. FIG. 23 shows a photograph of the catalyst of Example 1 before the durability test. FIG. 24 shows a photograph of the catalyst of Example 1 after the durability test. FIG. 25 shows a photograph of the catalyst of Comparative Example 1 after the durability test. A photograph of the catalyst of Comparative Example 1 before the durability test is not shown here, because Pt and Rh particles were so small that particle shapes could not be observed.

<Evaluation>

Figure 22:
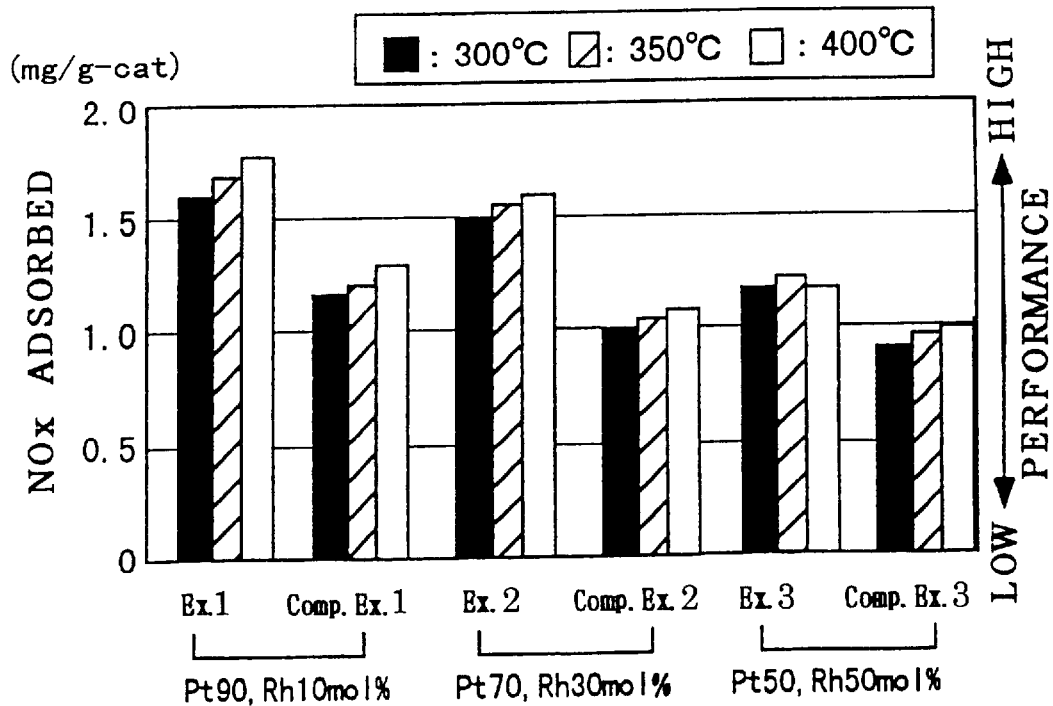
FIG. 22 is a graph showing the amounts of $NO_x$ adsorbed to the catalysts of Examples 1 to 3 and Comparative Examples 1 to 3 after a durability test.

As clear from FIGS. 21 and 22, in the case of comparing the catalysts of the example and the comparative example which had the same noble metal composition, the catalysts of the examples on which the Pt—Rh composite colloid was loaded had a larger amount of $NO_x$ adsorbed after a rich spike. This difference was remarkably greater after the durability test and the catalyst of the example was immensely superior in durability. This is supposed to be an effect of loading the noble metals as a noble metal composite colloid.

As evident from FIGS. 23 to 25, the catalyst of Example 1 had a Pt—Rh particle size as small as about 4 nm. As apparent from the fact that the particle size after the durability test was only about 5 nm, grain growth during the durability test was very little. In FIGS. 23 and 24, the projection in the upper right direction is a noble metal composite colloidal particle, and the striped pattern seen in the noble metal composite colloidal particle was the arrangement of the Pt atoms and the Rh atoms, and the blurred portion around the noble metal composite colloidal particle is the distortion of an electronic image. However, in the catalyst of Comparative Example 1, Pt or Rh particles could not be observed before the durability test because of their atomic state, but as FIG. 25 shows in its center the rough-triangle material which was a noble metal particle, the particle size grew to about 20 to 25 nm after the durability test.

That is to say, the grain growth of noble metals during the durability test in the catalyst of Example 1 was remarkably suppressed when compared with that of the catalyst of Comparative Example 1, and this fact is supposed to contribute to excellent durability of $NO_x$ conversion as described above. This is apparently an effect of loading the noble metals as a noble metal composite colloid.

<Experiment 7>

Figure 26:
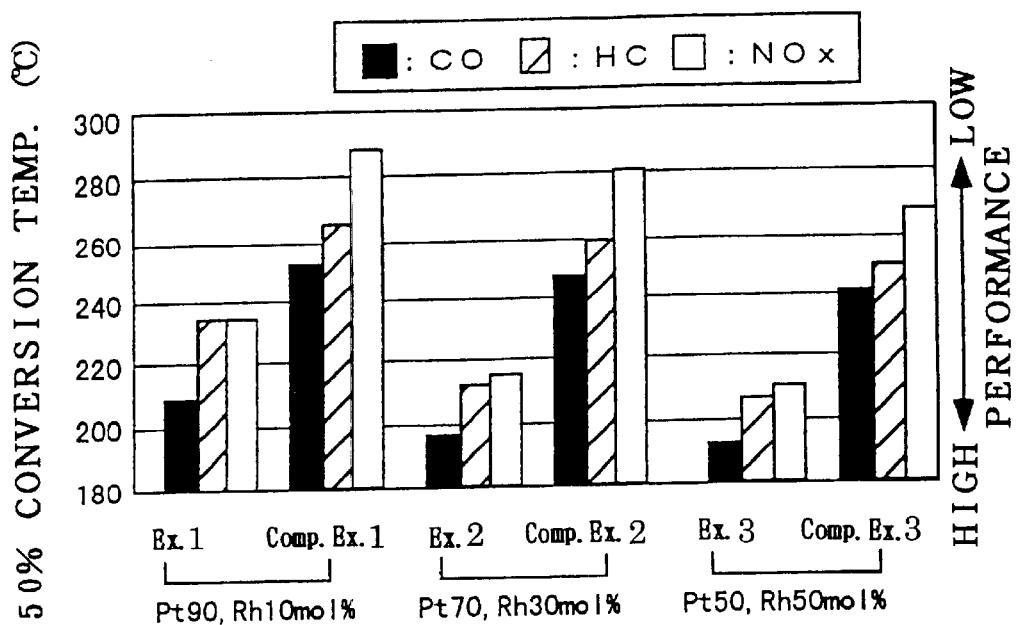
FIG. 26 is a graph showing 50% conversion temperatures of the catalysts of Examples 1 to 3 and Comparative Examples 1 to 3 in the initial stage.

The pellet catalysts of Examples 1 to 3 and Comparative Examples 1 to 3 were placed in laboratory reactors respectively, and a model exhaust gas with the composition shown in Table 5 was introduced at a space velocity of 100,000 $h^{-1}$. While the catalyst bed temperature was varied in the range from 25 to 600° C., 50% conversion temperatures of $HC(C_3H_6)$, CO and $NO_x$ were measured. The results are shown in FIG. 26.

A durability test was carried out by calcining the respective catalysts at 700° C. for ten hours in the air. The catalysts after the durability test were also examined about 50% conversion temperatures in the same way as above. The results are presented in FIG. 27.

TABLE 5

| NO (ppm) | $C_3H_6$ (ppm) | $CO_2$ (%) | CO (ppm) | $H_2$ (ppm) | $O_2$ (%) | $H_2O$ (%) | $N_2$ |
|---|---|---|---|---|---|---|---|
| 2400 | 7200 | 14.4 | 1200 | 400 | 0.5 | 3 | balance |

<Evaluation>

Figure 27:
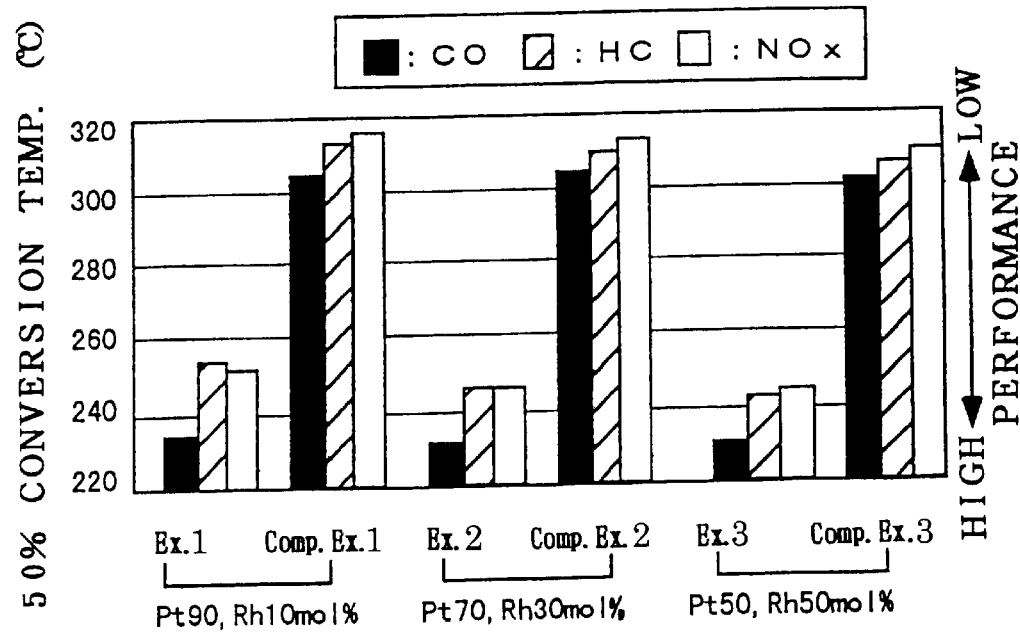
FIG. 27 is a graph showing 50% conversion temperatures of the catalysts of Examples 1 to 3 and Comparative Examples 1 to 3 after the durability test.

As apparent from FIGS. 26 and 27, in the case of comparing the catalysts which had the same noble metal composition, the catalysts of the examples had lower 50% conversion temperatures both in the initial stage and after the durability test, that is to say, had a higher catalytic activity. This is supposed to be an effect of loading the noble metals as a noble metal composite colloid.

<Experiment 8>

The pellet catalysts of Examples 1 to 3 and Comparative Examples 1 to 3 were placed in laboratory reactors respectively, and a gas prepared by adding 100 ppm of $SO_2$ to each model exhaust gas having the composition shown in Table 4 was introduced at a catalyst bed temperature of 600°

C., and a gas space velocity of 100,000 h$^{-1}$. Specifically speaking, a sulfur poisoning durability test was carried out by repeating a cycle comprising 55 seconds of fuel-lean gas supply and 5 seconds of fuel-rich gas supply for four hours. Then elemental analysis was performed on the catalysts after the sulfur poisoning durability test to measure the amount of S in the catalysts. The results are shown in FIG. 28.

<Evaluation>

Figure 28:
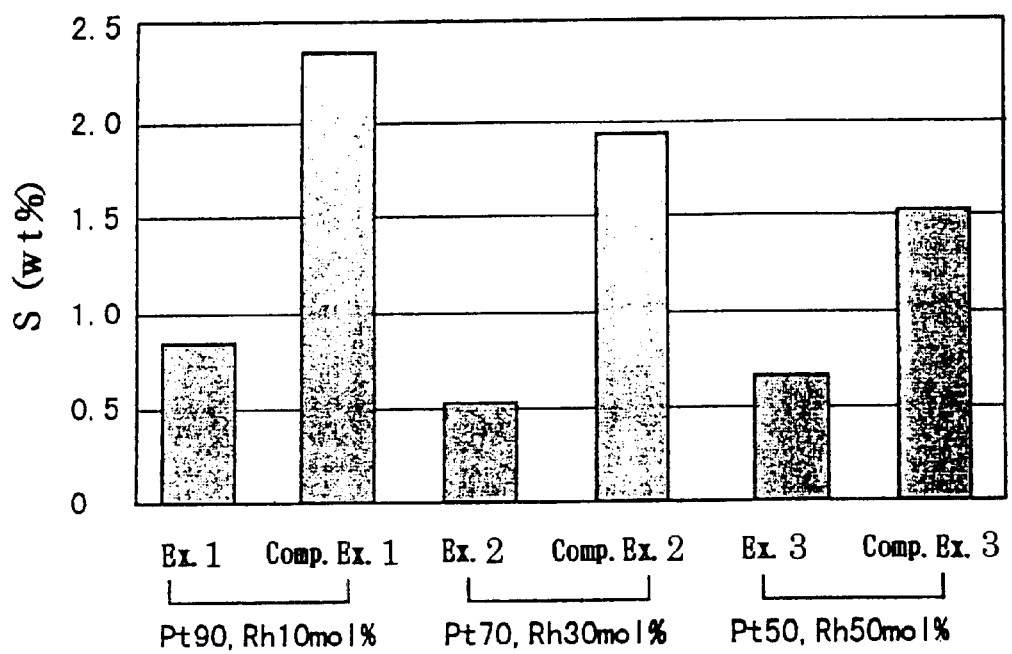
FIG. 28 is a graph showing the amounts of sulfur adsorbed to the catalysts of Examples 1 to 3 and Comparative Examples 1 to 3.

As seen from FIG. 28, in the case of comparing the catalysts which had the same noble metal composition, the catalysts of the examples after the durability test had smaller amounts of S adsorbed, and were greatly suppressed in terms of sulfur poisoning when compared with the catalysts of the comparative examples. This is supposed to be an effect of loading the noble metals as a noble metal composite colloid.

EXAMPLE 4

Figure 29:
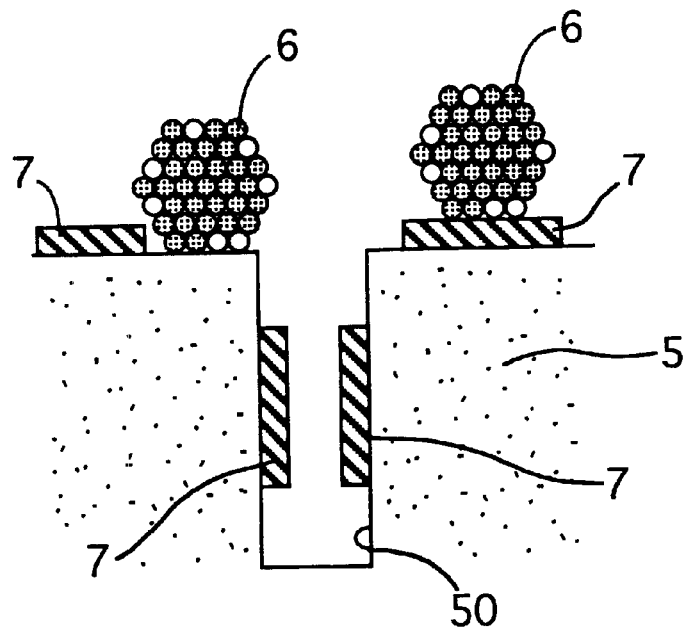
FIG. 29 is an explanatory view showing the micro structure of the catalyst of Example 1 schematically.

FIG. 29 shows the micro structure of the exhaust-gases-purifying catalyst of Example 1. Since the Pt—Rh composite colloid 6 of this catalyst had a diameter of about 3 nm, when the micro pores of alumina 5 had diameters as small as on the angstrom order, it was difficult to load the Pt—Rh composite colloid 6 in the micro pores 50. Therefore, only barium carbonate 7 was loaded in the micro pores 50.

However, since there were no noble metals in the vicinity of the barium carbonate loaded in the micro pores 50, HC adsorbed in the micro pores 50 were hardly oxidized. The barium carbonate 7 loaded in the micro pores 50 could not exhibit NO$_x$ adsorption and release capability effectively and the barium carbonate 7 could hardly be utilized effectively.

Figure 30:
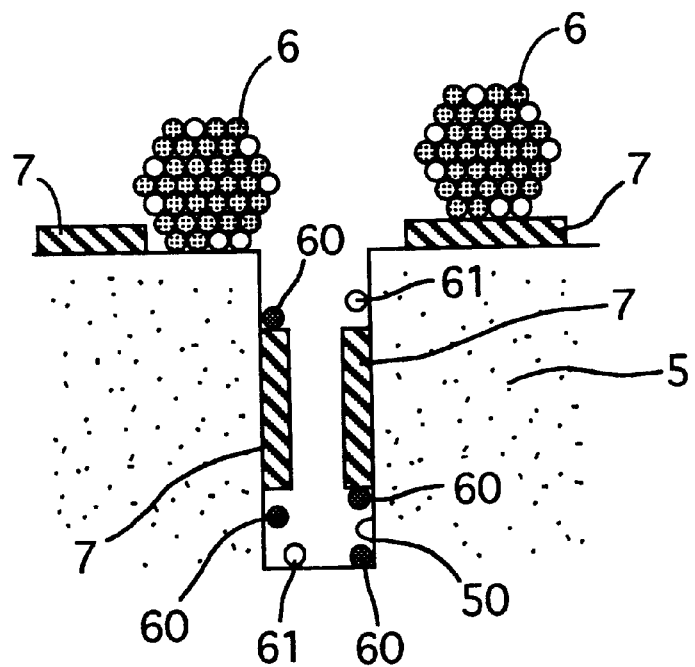
FIG. 30 is an explanatory view showing the micro structure of the catalyst of Example 4.

The exhaust-gases-purifying catalyst of the present example additionally had a noble metal in the atomic state in the micro pores of the alumina. The schematic diagram is shown in FIG. 30. This catalyst for purifying exhaust gases comprises alumina 5 as a porous oxide support, a Pt—Rh composite colloid 6 loaded on the surface of the alumina 5, atomic-state Pt 60 and Rh 61 loaded in the micro pores 50 of the alumina 5, and barium carbonate 7 as an NO$_x$ storage component loaded on the surface and in the micro pores 50 of the alumina 5. Hereinafter, the method of producing this exhaust-gases-purifying catalyst will be described instead of describing the arrangement in detail.

40 g of γ-Al$_2$O$_3$ powder was dispersed in 200 g of water, and 17.03 g of barium acetate was dissolved therein. Then the mixture was concentrated and dried into solids, thereby obtaining barium acetate-loaded alumina powder. Next, this barium acetate-loaded alumina powder was dispersed in a solution of 4.3 g ammonium hydrogen carbonate (NH$_4$HCO$_3$) in 300 g water. After stirred for fifteen minutes, this mixture was filtered under reduced pressure and dried, thereby preparing barium carbonate-loaded alumina powder.

This barium carbonate-loaded alumina powder was dispersed in 300 g of water. A Pt—Rh composite colloidal aqueous solution (Pt: 90 mol %, Rh: 10 mol %) produced in the same way as that of Example 1 was added to this so that the total mole of Pt and Rh was 1.54×10$^{-3}$ mol and stirred for thirty minutes. 50 g of a pyromellitic acid anhydride aqueous solution at a concentration of 0.2% by weight was added to this dispersed solution and stirred for fifteen minutes. Furthermore, a mixed aqueous solution of platinum dinitrodiamine complex and rhodium nitrate (Pt: 90 mol %, Rh 10 mol %) was added so that the total mole of Pt and Rh was 1.54×10$^{-3}$ mol. The mixture was stirred for thirty minutes and filtered under reduced pressure to collect powder.

This powder was dried at 110° C. for two hours and calcined at 450° C. for two hours, thereby preparing catalyst powder of the present example. The amount of noble metals loaded was 8.54×10$^{-5}$ mol with respect to 1 g of γ-Al$_2$O$_3$ powder, and the amount of Ba loaded was 1.67×10$^{-3}$ mol with respect to 1 g of γ-Al$_2$O$_3$.

EXAMPLE 5

Catalyst powder of Example 5 was prepared in the same way as that of Example 4, except that the Pt—Rh composite colloidal aqueous solution produced in the same way as that of Reference Example 13 and employed here had the composition of 70 mol % Pt and 30 mol % Rh, and that the mixed aqueous solution of platinum dinitrodiamine complex and rhodium nitrate employed here had the composition of 70 mol % Pt and 30 mol % Rh. The amounts of the respective ingredients loaded were the same as those of Example 4.

COMPARATIVE EXAMPLE 4

The barium carbonate-loaded alumina powder produced in the same way as that of Example 4 was dispersed in 300 g of water. A Pt—Rh composite colloidal aqueous solution (Pt: 90 mol %, Rh 10 mol %) produced in the same way as that of Example 4 was added to this so that the total mole of Pt and Rh was 3.08×10$^{-3}$ mol. The mixture was stirred for thirty minutes and filtered under reduced pressure to collect powder.

This powder was dried 110° C. for two hours and then calcined at 450° C. for two hours, thereby preparing catalyst powder of this comparative example. The amount of noble metals loaded was 8.54×10$^{-5}$ mol with respect to 1 g of γ-Al$_2$O$_3$ powder.

This exhaust-gases-purifying catalyst of Comparative Example 4 had the same arrangement as the exhaust-gases-purifying catalyst of Example 1 except that the amounts of noble metals and Ba loaded were different from those of Example 15, and had the structure shown in FIG. 29.

COMPARATIVE EXAMPLE 5

Catalyst powder of Comparative Example 5 was prepared in the same way as that of Comparative Example 4, except that a mixed aqueous solution of platinum dinitrodiamine complex and rhodium nitrate (Pt: 90 mol %, Rh 10 mol %) was used instead of the Pt—Rh composite colloidal aqueous solution. The amounts of the respective ingredients loaded were the same as those of Comparative Example 4.

This exhaust-gases-purifying catalyst of Comparative Example 5 had the same arrangement as the exhaust-gases-purifying catalyst of Comparative Example 1, except that the amounts of noble metals and Ba loaded were different from those of Comparative Example 12. The catalyst of Comparative Example 16 had the structure shown in FIG. 20.

COMPARATIVE EXAMPLE 6

Catalyst powder of Comparative Example 6 was prepared in the same way as that of Comparative Example 4, except that the Pt—Rh composite colloidal aqueous solution employed had the composition of 70 mol % Pt and 30 mol % Rh. The amounts of the respective ingredients loaded were the same as those of Comparative Example 4.

The exhaust-gases-purifying catalyst of Comparative Example 6 had the same arrangement as the exhaust-gases-purifying catalyst of Example 1, except that the amounts of noble metals and Ba loaded were different from those of Example 1. The catalyst of Comparative Example 17 had the structure shown in FIG. 29.

COMPARATIVE EXAMPLE 7

Catalyst powder of Comparative Example 7 was prepared in the same way as that of Comparative Example 4, except that a mixed aqueous solution of platinum dinitrodiamine complex and rhodium nitrate (Pt: 70 mol %, Rh: 30 mol %) was employed instead of the Pt—Rh composite colloidal aqueous solution. The amounts of the respective ingredients loaded were the same as those of Comparative Example 4.

This exhaust-gases-purifying catalyst of Comparative Example 7 had the same arrangement as the exhaust-gases-purifying catalyst of Comparative Example 1, except that the amounts of noble metals and Ba loaded were different from those of Comparative Example 1. The catalyst of Comparative Example 7 had the structure shown in FIG. 20.

<Experiment 9>

The catalyst powder of Examples 4 to 5 and Comparative Examples 4 to 7 were shaped into pellets of 1 to 3 mm in particle size, and placed respectively in laboratory reactors and a model gas shown in the aforementioned Table 4 was introduced at a gas space velocity of 100,000 h$^{-1}$. While the catalyst bed temperature was controlled at three levels, 300° C., 350° C. and 400° C., measurement was conducted on the saturated amount of NO$_x$ adsorbed after switched from the fuel-rich gas supply to the constant fuel-lean gas supply (the saturated amount of NO$_x$ adsorbed). Then measurement was conducted on the amount of NO$_x$ adsorbed just after switched from the constant fuel-lean gas supply to the fuel-rich gas supply for five seconds and again to the fuel-lean gas supply (the amount of NO$_x$ adsorbed after a fuel-rich spike). Besides, a durability test was conducted by calcining the respective catalysts at 700° C. for ten hours in the air, and then the same measurement was also carried out on the catalysts after the durability test.

Figure 31:
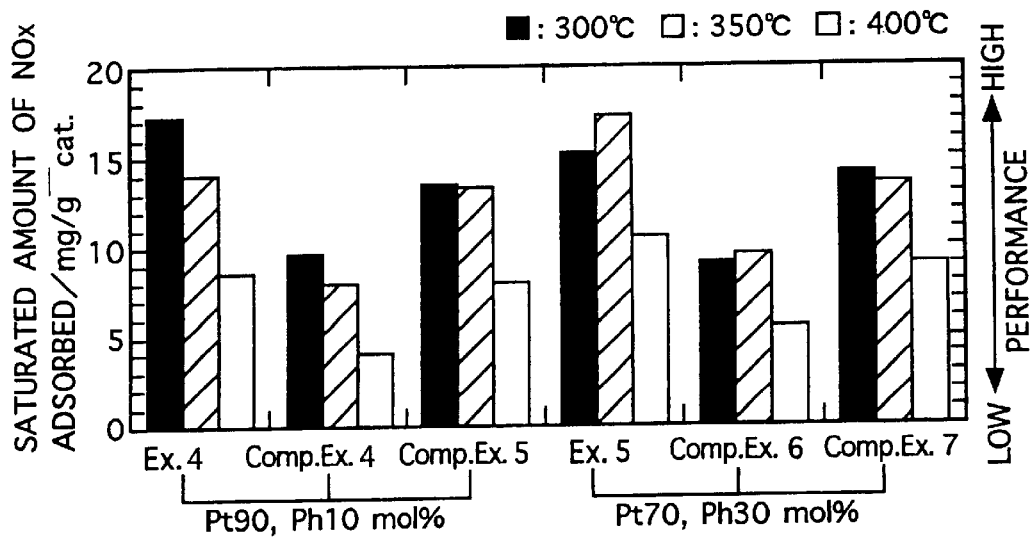
FIG. 31 is a graph showing the saturated amounts of $NO_x$ adsorbed to the catalysts of Examples 4 to 5 and Comparative Examples 4 to 7 in the initial stage.
Figure 32:
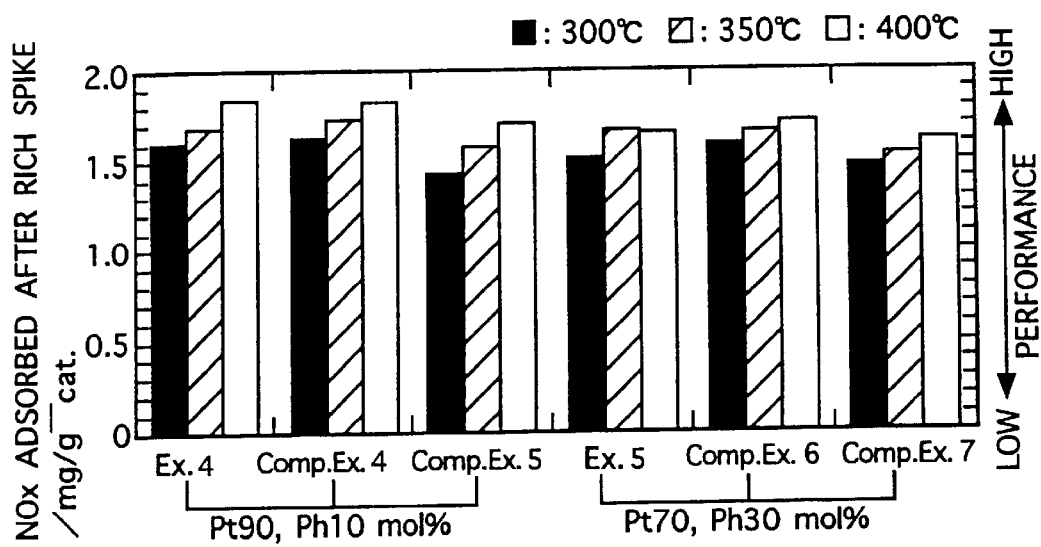
FIG. 32 is a graph showing the amounts of $NO_x$ adsorbed to the catalyst of Examples 4 to 5 and Comparative Examples 4 to 7 after fuel-rich spikes.
Figure 33:
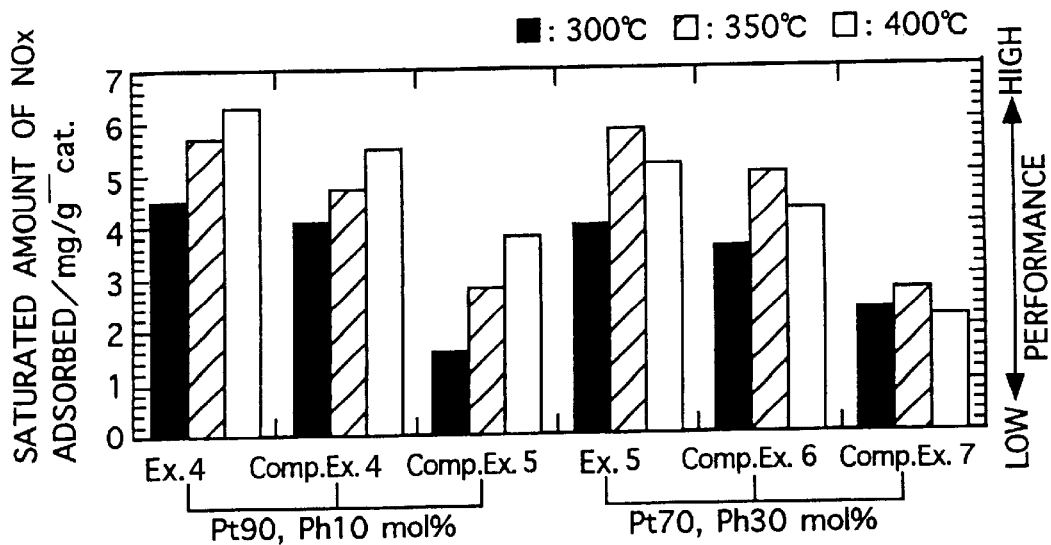
FIG. 33 is a graph showing the saturated amounts of $NO_x$ adsorbed to the catalysts of Examples 4 to 5 and Comparative Examples 4 to 7 after a durability test.
Figure 34:
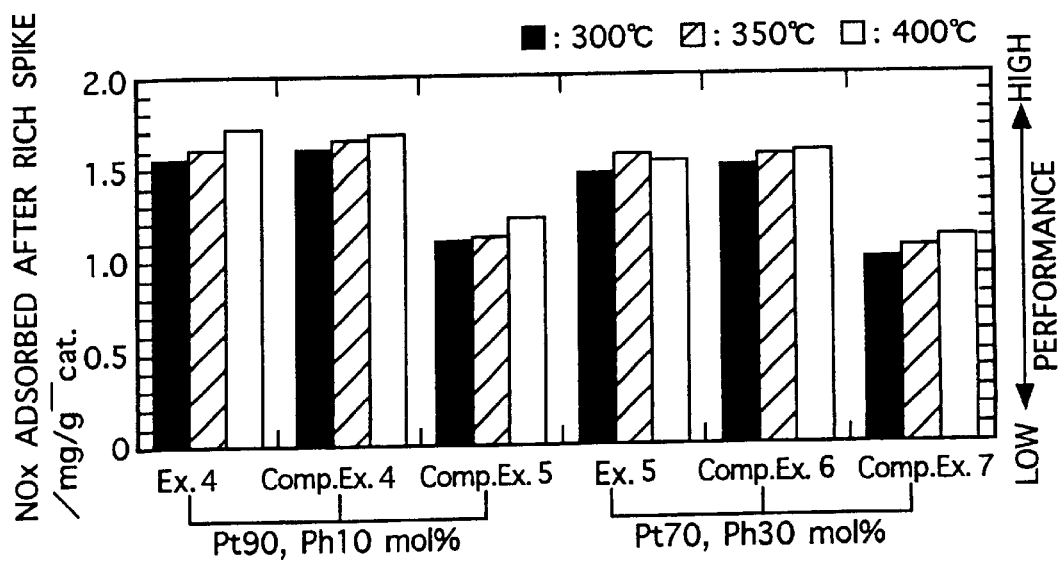
FIG. 34 is a graph showing the amounts of $NO_x$ adsorbed to the catalysts of Examples 4 to 5 and Comparative Examples 4 to 7 after fuel-rich spikes after the durability test.

FIG. 31 shows the saturated amounts of NO$_x$ adsorbed of the brand new catalysts. FIG. 32 shows the amounts of NO$_x$ adsorbed of the brand new catalyst after a rich spike. FIG. 33 shows the saturated amounts of NO$_x$ adsorbed of the catalysts after the durability test. FIG. 34 shows the amounts of NO$_x$ adsorbed after the rich spike, which the catalysts after the durability test exhibited.

<Evaluation>

As evident from FIG. 31, in the case of comparing the catalysts which had the same noble metal composition, the catalysts of the examples on which the Pt—Rh composite colloid, platinum dinitrodiamine complex and rhodium nitrate were loaded simultaneously had larger saturated amounts of NO$_x$ adsorbed in the initial stage than the catalysts of the comparative examples. As clear from FIG. 32, the catalysts of the examples had larger amounts of NO$_x$ adsorbed after the rich spike than the catalysts of the comparative examples. Similar evaluation to these was obtained from FIGS. 33 and 34, and it is clear that the catalysts of Examples 4 and 5 were excellent also in durability. It is apparent that these effects were caused by loading the Pt—Rh composite colloid and platinum dinitrodiamine complex and rhodium nitrate simultaneously by using pyromellitic acid.

It is also apparent from the comparison of the comparative examples that the catalysts of Comparative Examples 4, 6 on which the noble metals were loaded as a Pt—Rh composite colloid were remarkably improved in durability than the catalysts of Comparative Examples 5, 7 on which the noble metals were loaded as platinum dinitrodiamine complex and rhodium nitrate.

<Experiment 10>

The pellet catalysts of Examples 4, 5 and Comparative Examples 4 to 7 were respectively placed in laboratory reactors and a model exhaust gas having the composition shown in Table 5 above was introduced at a space velocity of 100,000 h$^{-1}$. While the catalyst bed temperature was varied in the range from 25 to 600° C., the 50% conversion temperatures of HC (C$_3$H$_6$), CO and NO$_x$ were measured. The results are shown in FIG. 35.

Besides, a durability test was carried out by calcining the respective catalysts at 700° C. for ten hours in the air, and the catalysts after the durability test were examined about the 50% conversion temperatures in the same way as above. The results are presented in FIG. 36.

<Evaluation>

Figure 35:
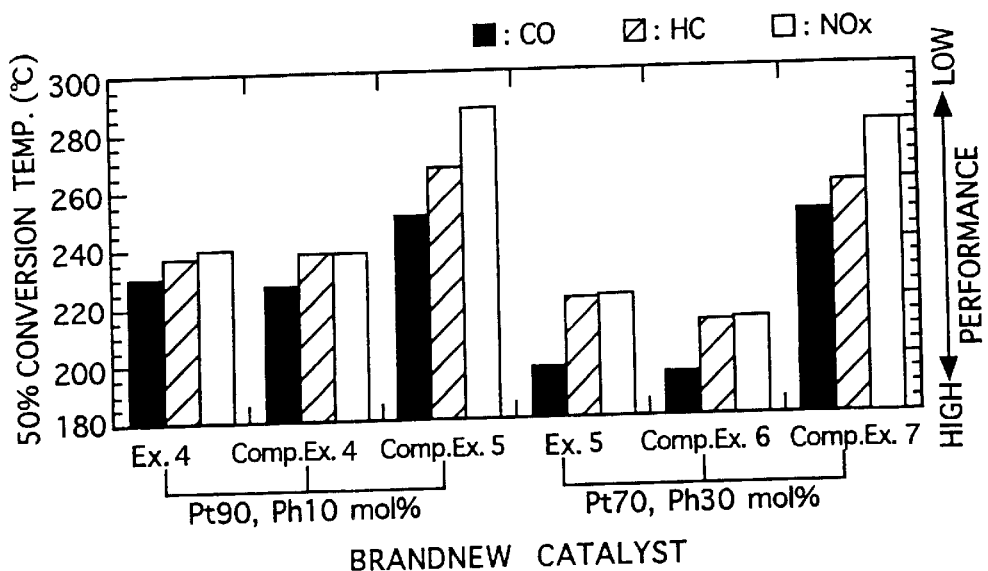
FIG. 35 is a graph showing 50% conversion temperatures of the catalysts of Examples 4 to 5 and Comparative Examples 4 to 7 in the initial stage.
Figure 36:
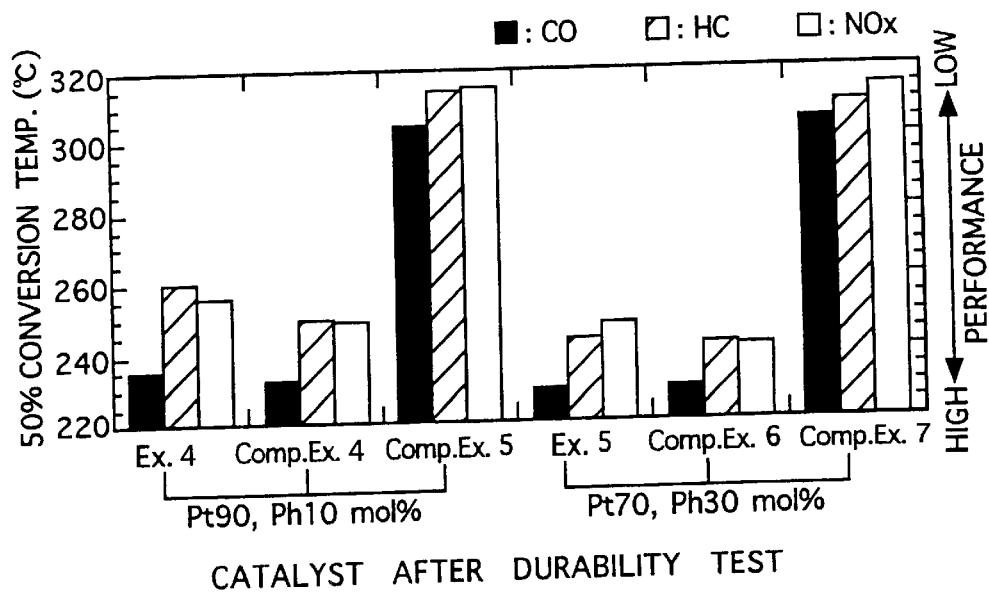
FIG. 36 is a graph showing 50% conversion temperatures of the catalysts of Examples 4 to 5 and Comparative Examples 4 to 7 after the durability test.

As apparent from FIGS. 35 and 36, in the case of comparing the catalysts which had the same noble metal composition, the catalysts of Examples 4, 5 and Comparative Examples 4, 6 on which the Pt—Rh composite colloid was loaded had lower 50% conversion temperatures, that is to say, had higher catalytic activity than the catalysts of Comparative Examples 5, 7 on which the noble metals in the atomic state were loaded. It is also clear that the former catalysts had smaller decrease in catalytic activity after the durability test.

The catalysts of Examples 4, 5 on which the Pt—Rh composite colloid and platinum dinitrodiamine complex and rhodium nitrate were simultaneously loaded by using pyromellitic acid, and the catalysts of Comparative Examples 4, 6 on which only the Pt—Rh composite colloid was loaded exhibited almost the same level results, which were far better than the catalysts of Comparative Examples 5, 7 on which the noble metals were loaded as platinum dinitrodiamine complex and rhodium nitrate. This indicates that the effect of loading noble metals as a noble metal colloid was obtained even when the Pt—Rh composite colloid was loaded simultaneously with platinum dinitrodiamine complex and rhodium nitrate. This effect is supposed to be caused by loading the Pt—Rh composite colloid on the surface of the support and loading atomic-state Pt and Rh in the micro pores of the support.

POSSIBLE INDUSTRIAL UTILITY

According to the exhaust-gases-purifying catalysts recited in claim 2, noble metal grain growth during the durability test is suppressed, so the catalytic activity is suppressed from decreasing due to the collapse of time and these catalysts are extremely superior in durability. Sulfur poisoning of the NO$_x$ storage component is also suppressed.

Moreover, according to the exhaust-gases-purifying catalyst recited in claim 3, HC adsorbed in the micro pores of the support can be oxidized efficiently. According to the exhaust-gases-purifying catalyst recited in claim 4, the NO$_x$ storage component loaded in the micro pores of the support is utilized effectively, so the NO$_x$ conversion ability is improved further.

According to the production method recited in claim 6, the exhaust-gases-purifying catalysts recited in claim 3 and claim 4 can be produced with ease.

According to the exhaust-gases-purifying method recited in claim 7, catalytic activity is suppressed from decreasing due to the collapse of time and the NO$_x$ storage ability can be maintained high, so NO$_x$ conversion ability can be stably maintained high for a long time.

What is claimed is:

1. A catalyst for purifying exhaust gases, characterized in being produced by loading on a porous oxide support a noble metal composite colloid composed of a plurality of noble metals, wherein the noble metals of the noble metal colloid composite are present as particles between 1 to 5 nm, and an $NO_x$ storage component selected from the group consisting of alkali metals, alkaline-earth metals and rare-earth elements.

2. The catalyst according to claim 1, wherein the particles are about 3 nm.

3. A catalyst for purifying exhaust gases, characterized in being produced by loading a noble metal composite colloid composed of a plurality of noble metals, wherein the noble metals of the noble metal colloid composite are present as particles between 1 to 5 nm, on the surface of a porous oxide support, and loading an atomic-state noble metal in micro pores of said porous oxide support.

4. A catalyst for purifying exhaust gases, characterized in being produced by loading on the surface of a porous oxide support a noble metal composite colloid composed of a plurality of noble metals, wherein the noble metals of the noble metal colloid composite are present as particles between 1 to 5 nm, and an $NO_x$ storage component selected from the group consisting of alkali metals, alkaline-earth metals and rare-earth elements, and loading in micro pores of said porous oxide support a noble metal in the atomic state and said $NO_x$ storage component.

5. A method of producing an exhaust-gases-purifying catalyst, characterized in comprising:
   a separation step of taking a noble metal composite colloid out of a polymer-protected noble metal composite colloid which is composed of a plurality of noble metals and protected by a polymeric material;
   a solution preparation step of dispersing said noble metal composite colloid in water by using a surfactant so as to prepare a surfactant-protected noble metal composite colloidal solution;
   a noble-metal-colloid-loading step of bringing a porous oxide support in contact with said surfactant-protected noble metal composite colloidal solution so as to load a surfactant-protected noble metal composite colloid on said porous oxide support; and
   an atomic-state-noble-metal-loading step of bringing said porous oxide support in contact with an aqueous solution of pyromellitic acid and a noble metal compound so as to load an atomic-state noble metal on said porous oxide support.

6. A method of purifying exhaust gases, characterized in placing, in exhaust gases in oxygen-excessive atmospheres, a catalyst produced by loading on a porous oxide support a noble metal composite colloid composed of a plurality of noble metals, wherein the noble metals of the noble metal colloid composite are present as particles between 1 to 5 nm, and an $NO_x$ storage component selected from the group consisting of alkali metals, alkaline-earth metals and rare-earth elements so as to adsorb $NO_x$ in said exhaust gases on said $NO_x$ storage component, and changing the exhaust gas atmospheres to a stoichiometric point or on a fuel-rich side so as to release said $NO_x$ from said $NO_x$ storage component and reduce said $NO_x$.

* * * * *